US011329773B2

United States Patent
Lei et al.

(10) Patent No.: US 11,329,773 B2
(45) Date of Patent: May 10, 2022

(54) NON-ORTHOGONAL MULTIPLE ACCESS HOPPING PATTERN TECHNIQUES FOR SPREADING SEQUENCES

(71) Applicant: QUALCOMM Incorporated, San Diego, CA (US)

(72) Inventors: Jing Lei, San Diego, CA (US); Seyong Park, San Diego, CA (US); Gabi Sarkis, San Diego, CA (US); Ying Wang, San Diego, CA (US); Joseph Binamira Soriaga, San Diego, CA (US); Jay Kumar Sundararajan, San Diego, CA (US); Tingfang Ji, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 16/573,842

(22) Filed: Sep. 17, 2019

(65) Prior Publication Data

US 2020/0092056 A1 Mar. 19, 2020

Related U.S. Application Data

(60) Provisional application No. 62/733,547, filed on Sep. 19, 2018.

(51) Int. Cl.
*H04L 5/00* (2006.01)
*H04W 72/04* (2009.01)
*H04W 72/12* (2009.01)

(52) U.S. Cl.
CPC ......... *H04L 5/0012* (2013.01); *H04W 72/044* (2013.01); *H04W 72/121* (2013.01); *H04W 72/1268* (2013.01); *H04W 72/1289* (2013.01)

(58) Field of Classification Search
CPC .............. H04L 5/0012; H04W 72/044; H04W 72/1268; H04W 72/121; H04W 72/1289
See application file for complete search history.

(56) References Cited

U.S. PATENT DOCUMENTS

2018/0309553 A1* 10/2018 Cao .................... H04W 72/046
2019/0029031 A1* 1/2019 Kumar .............. H04W 28/0278
(Continued)

FOREIGN PATENT DOCUMENTS

WO WO-2019157699 A1 8/2019

OTHER PUBLICATIONS

Fujitsu: "Considerations on Procedures Related to NOMA", 3GPP Draft, 3GPP TSG RAN WG1 Meeting #94, R1-1808290, Considerations on Procedures Related to NOMA, 3rd Generation Partnership Project (3GPP), Mobile Competence Centre, 650, Route Des Lucioles, F-06921, Sophia-Antipolis Cedex, France, vol. RAN WG1. No. Gothenburg. Sweden; Aug. 20, 2018-Aug. 24, 2018, Aug. 10, 2018 (Aug. 10, 2018). XP051515673, 4 pages, Retrieved from the Internet: URL: http://www.3gpp.org/ftp/tsg%5Fran/WG1% 5FRL1/TSGR1%5F94/Docs/R1%2D1808290%2Ezip [retrieved on Aug. 10, 2018]paragraphs [0001]. [0002].
(Continued)

*Primary Examiner* — Jeffrey M Rutkowski
*Assistant Examiner* — Chae S Lee
(74) *Attorney, Agent, or Firm* — Holland & Hart LLP

(57) ABSTRACT

Methods, systems, and devices for wireless communications are described that provide sequences of spreading codes and hopping patterns that may be used in non-orthogonal multiple access (NOMA) communications between a user equipment (UE) and a base station. A codebook of spreading codes and the associated hopping patterns may be systematically constructed by closed form formulas or look up table. The base station may receive multiple concurrent
(Continued)

transmissions from multiple different UEs, and the sequences of spreading codes and hopping patterns, may be used to identify a particular UE of the multiple UEs.

29 Claims, 18 Drawing Sheets

(56) References Cited

U.S. PATENT DOCUMENTS

| | | | |
|---|---|---|---|
| 2020/0092057 A1* | 3/2020 | Herath | H04L 27/34 |
| 2020/0146026 A1* | 5/2020 | Shimezawa | H04W 72/02 |
| 2020/0154481 A1* | 5/2020 | Goto | H04W 74/004 |
| 2020/0396698 A1* | 12/2020 | Bala | H04L 5/0005 |

OTHER PUBLICATIONS

International Search Report and Written Opinion—PCT/US2019/051754—ISA/EPO—dated Dec. 20, 2019.
Qualcomm Incorporated: "Transmitter Side Signal Processing Schemes for NOMA," 3GPP Draft, 3GPP TSG RAN WG1 Meeting #94, R1-1809434, Transmitter Side Signal Processing Schemes for NOMA, 3rd Generation Partnership Project (3GPP), Mobile Competence Centre, 650, Route Des Lucioles, F-06921, Sophia-Antipolis Cedex, France, vol. RAN WG1. No. Gothenburg. Sweden, Aug. 20, 2018-Aug. 24, 2018, Aug. 11, 2018 (Aug. 11, 2018), XP051516798, pp. 1-12, Retrieved from the Internet: URL: http://www.3gpp.org/ftp/tsg%5Fran/WG1%5FRL1/TSGR1%5F94/Docs/R1%2D1809434%2Ezip [retrieved on Aug. 11, 2018], paragraph [03.2]; figures 1. 3.

* cited by examiner

| Hop | Group 1 | Group 2 | Group 3 | ... | Group (N-1) | Group N |
|---|---|---|---|---|---|---|
| 0 | 1 | 2 | 3 | ... | N-1 | N |
| 1 | N+1-M | 2+M | N+3-M | | N-1-$(-1)^N$M | N+$(-1)^N$M (even N); N (odd N) |
| 2 | 2+M | N+3-M | | | N+$(-1)^N$M (even N); N (odd N) | N+1-M |

| Hop | Group 1 | Group 2 | Group 3 | ... | Group (N-1) | Group N |
|---|---|---|---|---|---|---|
| 0 | $k_1$ | $k_2$ | $k_3$ | ... | $k_{N-1}$ | $k_N$ |
| 1 | $k_N$ | $k_{N-1}$ | $k_{N-2}$ | | $k_2$ | $k_1$ |
| 2 | $k_{N-1}$ | $k_{N-2}$ | | | $k_1$ | $k_N$ |

NON-ORTHOGONAL MULTIPLE ACCESS HOPPING PATTERN TECHNIQUES FOR SPREADING SEQUENCES

CROSS REFERENCE

The present application for patent claims the benefit of U.S. Provisional Patent Application No. 62/733,547 by Lei et al., entitled "NON-ORTHOGONAL MULTIPLE ACCESS (NOMA) HOPPING PATTERN TECHNIQUES FOR SPREADING SEQUENCES," filed Sep. 19, 2018, assigned to the assignee hereof, and expressly incorporated by reference in its entirety.

FIELD OF TECHNOLOGY

The following relates generally to wireless communications and to non-orthogonal multiple access (NOMA) hopping pattern techniques for spreading sequences.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support non-orthogonal multiple access (NOMA) hopping pattern techniques for spreading sequences. In various aspects, sequences of spreading codes may be used by a transmitter (e.g., a user equipment (UE)), in a transmission to a receiver (e.g., a base station). The base station may receive multiple concurrent transmissions from multiple different UEs, and the sequences of spreading codes, and hopping pattern applied to the sequences of spreading codes, may be used to identify a particular UE of the multiple UEs. The combination of a sequence of spreading codes and hopping pattern applied to the sequence of spreading codes may form a multiple access (MA) signature for a UE. In some cases, the sequence of spreading codes may be associated with a group of UEs, and each UE may apply a UE-specific hopping pattern. The UE-specific hopping patterns may be configured to provide relatively low cross-correlation between pairs of hopping patterns for UEs within the group, which may help improve receiver performance in a NOMA system.

A method of wireless communication at a UE is described. The method may include identifying a hopping pattern for applying sequences of two or more multiple access signatures to different portions of an uplink communication to a base station, applying the sequences of two or more multiple access signatures to the different portions of the uplink communication based on the identifying, and transmitting the uplink communication to the base station.

An apparatus for wireless communication at a UE is described. The apparatus may include a processor, memory in electronic communication with the processor, and instructions stored in the memory. The instructions may be executable by the processor to cause the apparatus to identify a hopping pattern for applying sequences of two or more multiple access signatures to different portions of an uplink communication to a base station, apply the sequences of two or more multiple access signatures to the different portions of the uplink communication based on the identifying, and transmit the uplink communication to the base station.

Another apparatus for wireless communication at a UE is described. The apparatus may include means for identifying a hopping pattern for applying sequences of two or more multiple access signatures to different portions of an uplink communication to a base station, applying the sequences of two or more multiple access signatures to the different portions of the uplink communication based on the identifying, and transmitting the uplink communication to the base station.

A non-transitory computer-readable medium storing code for wireless communication at a UE is described. The code may include instructions executable by a processor to identify a hopping pattern for applying sequences of two or more multiple access signatures to different portions of an uplink communication to a base station, apply the sequences of two or more multiple access signatures to the different portions of the uplink communication based on the identifying, and transmit the uplink communication to the base station.

In some examples of the method, apparatuses, and non-transitory computer-readable medium described herein, the hopping pattern may be a function of time and an identification of the UE, and where the applying may include operations, features, means, or instructions for applying a first sequence of the two or more multiple access signatures based on a time instance associated with a first portion of the uplink communication. In some examples of the method, apparatuses, and non-transitory computer-readable medium described herein, the time instance associated with the first portion of the uplink communication corresponds to a predetermined number of modulation symbols of the uplink communication. In some examples of the method, apparatuses, and non-transitory computer-readable medium described herein, the time instance associated with the first portion of the uplink communication corresponds to a predetermined number of inverse fast Fourier transform (IFFT) blocks of the uplink communication.

In some examples of the method, apparatuses, and non-transitory computer-readable medium described herein, the applying may include operations, features, means, or instructions for receiving radio resource control (RRC) signaling from the base station that indicates group indexes of hopping patterns of multiple access signatures, receiving downlink control information that indicates a group index value for the UE, identifying a first sequence of spreading codes based on the group index value, the first sequence of spreading codes including at least the two or more multiple access signatures associated with the group of UEs and applying the first sequence of spreading codes to a first portion of the uplink communication.

In some examples of the method, apparatuses, and non-transitory computer-readable medium described herein, the applying further may include operations, features, means, or instructions for determining a second sequence of spreading codes based on the group index value, a number of transmission layers at the UE, and a number of available multiple access signatures and applying the second sequence of spreading codes to a second portion of the uplink communication. In some examples of the method, apparatuses, and non-transitory computer-readable medium described herein, the applying further may include operations, features, means, or instructions for determining a third sequence of spreading codes based on a cyclic shift of the second sequence of spreading codes and applying the third sequence of spreading codes to a third portion of the uplink communication.

In some examples of the method, apparatuses, and non-transitory computer-readable medium described herein, the applying further may include operations, features, means, or instructions for determining a second sequence of spreading codes as a reversed order of the first sequence of spreading codes, applying the second sequence of spreading codes to a second portion of the uplink communication, determining a third sequence of spreading codes based on a cyclic shift of the second sequence of spreading codes and applying the third sequence of spreading codes to a third portion of the uplink communication.

In some examples of the method, apparatuses, and non-transitory computer-readable medium described herein, the hopping pattern and the two or more multiple access signatures form a UE-specific multiple access signature for the uplink communication, and where a cross-correlation between different UE-specific multiple access signatures may be below a threshold value. In some examples of the method, apparatuses, and non-transitory computer-readable medium described herein, the two or more multiple access signatures may be applied as symbol level spreading to a cyclic prefix orthogonal frequency division multiplexing (CP-OFDM) or a discrete Fourier transform spread OFDM (DFT-s-OFDM) waveform.

Some examples of the method, apparatuses, and non-transitory computer-readable medium described herein may further include operations, features, means, or instructions for receiving multiple access signature configuration information from the base station that indicates the two or more multiple access signatures and the hopping pattern. In some examples of the method, apparatuses, and non-transitory computer-readable medium described herein, the multiple access signature configuration information may be received from the base station in a master information block (MIB), in a SIB, in remaining minimum system information (RMSI), in a group common PDCCH, in RRC signaling, in dynamic downlink control information (DCI) associated with the uplink communication, or any combination thereof.

In some examples of the method, apparatuses, and non-transitory computer-readable medium described herein, the applying the sequences of two or more multiple access signatures to the different portions of the uplink communication may include operations, features, means, or instructions for applying a first sequence of spreading codes to each layer of a multi-layer uplink communication and superimposing each layer of the multi-layer uplink communication to generate a superimposed uplink signal. In some examples of the method, apparatuses, and non-transitory computer-readable medium described herein, the two or more multiple access signatures may be identified from a codebook of a set of codebooks that each include a set of spreading codes.

Some examples of the method, apparatuses, and non-transitory computer-readable medium described herein may further include operations, features, means, or instructions for selecting the two or more multiple access signatures from the codebook based on a UE identification or an index value assigned to the UE by the base station. In some examples of the method, apparatuses, and non-transitory computer-readable medium described herein, the set of spreading codes of each of the set of codebooks include modified chirp sequences (MCPs), computer generated sequences (CGSs), pseudo-random noise (PN) sequences, or combinations thereof. In some examples of the method, apparatuses, and non-transitory computer-readable medium described herein, the uplink communication includes an uplink NOMA communication.

A method of wireless communication at a base station is described. The method may include identifying a set of UEs configured for concurrent uplink communications and transmitting, to the set of UEs, an indication of a multiple access signature to be applied to uplink communications of each UE of the set of UEs, where the multiple access signature for each UE is based on a sequence of spreading codes and a hopping pattern applied to the sequence of spreading codes for different portions of uplink communications.

An apparatus for wireless communication at a base station is described. The apparatus may include a processor, memory in electronic communication with the processor, and instructions stored in the memory. The instructions may be executable by the processor to cause the apparatus to identify a set of UEs configured for concurrent uplink communications and transmit, to the set of UEs, an indication of a multiple access signature to be applied to uplink communications of each UE of the set of UEs, where the multiple access signature for each UE is based on a sequence of spreading codes and a hopping pattern applied to the sequence of spreading codes for different portions of uplink communications.

Another apparatus for wireless communication at a base station is described. The apparatus may include means for identifying a set of UEs configured for concurrent uplink communications and transmitting, to the set of UEs, an indication of a multiple access signature to be applied to uplink communications of each UE of the set of UEs, where the multiple access signature for each UE is based on a sequence of spreading codes and a hopping pattern applied to the sequence of spreading codes for different portions of uplink communications.

A non-transitory computer-readable medium storing code for wireless communication at a base station is described. The code may include instructions executable by a processor to identify a set of UEs configured for concurrent uplink communications and transmit, to the set of UEs, an indication of a multiple access signature to be applied to uplink communications of each UE of the set of UEs, where the multiple access signature for each UE is based on a sequence of spreading codes and a hopping pattern applied to the sequence of spreading codes for different portions of uplink communications.

Some examples of the method, apparatuses, and non-transitory computer-readable medium described herein may further include operations, features, means, or instructions for receiving at least two concurrent uplink communications from at least two UEs of the set of UEs using a common set of uplink resources and determining each UE of the set of UEs that transmitted each of the at least two concurrent uplink communications, based on multiple access signatures that may be applied to each of the concurrent uplink communications.

In some examples of the method, apparatuses, and non-transitory computer-readable medium described herein, the hopping pattern of each UE may be a function of time and a UE identification, and a first sequence of spreading codes of a first UE may be based on a time instance associated with a first portion of the uplink communication of the first UE. In some examples of the method, apparatuses, and non-transitory computer-readable medium described herein, the time instance associated with the first portion of the uplink communication corresponds to a predetermined number of modulation symbols of the uplink communication. In some examples of the method, apparatuses, and non-transitory computer-readable medium described herein, the time instance associated with associated with the first portion of the uplink communication corresponds to a predetermined number of inverse fast Fourier transform (IFFT) blocks of the uplink communication.

In some examples of the method, apparatuses, and non-transitory computer-readable medium described herein, the indication of the multiple access signature to be applied at each UE includes a group index value, and where each UE identifies a corresponding sequence of spreading codes based on the group index value. In some examples of the method, apparatuses, and non-transitory computer-readable medium described herein, a second sequence of spreading codes of each UE may be based on the group index value, a number of transmission layers at the UE, and a number of available spreading codes. In some examples of the method, apparatuses, and non-transitory computer-readable medium described herein, a third sequence of spreading codes of each UE may be based on a cyclic shift of the second sequence of spreading codes.

In some examples of the method, apparatuses, and non-transitory computer-readable medium described herein, a second sequence of spreading codes may be a reversed order of an initial sequence of spreading codes, and a third sequence of spreading codes may be based on a cyclic shift of the second sequence of spreading codes.

In some examples of the method, apparatuses, and non-transitory computer-readable medium described herein, the hopping pattern and two or more multiple access signatures form a UE-specific multiple access signature for the uplink communication, and where a cross-correlation between different UE-specific multiple access signatures is below a threshold value. In some examples of the method, apparatuses, and non-transitory computer-readable medium described herein, the sequence of spreading codes may be applied as symbol level spreading to a CP-OFDM waveform or a DFT-s-OFDM waveform.

In some examples of the method, apparatuses, and non-transitory computer-readable medium described herein, the indication of the multiple access signature to be applied to uplink communications of each UE may be transmitted in a master information block (MIB), in a SIB, in remaining minimum system information (RMSI), in a group common PDCCH, in RRC signaling, in dynamic DCI associated with the uplink communication, or any combination thereof.

Some examples of the method, apparatuses, and non-transitory computer-readable medium described herein may further include operations, features, means, or instructions for identifying a sequence of multiple access signatures from a codebook of a set of codebooks that each include a set of spreading codes. In some examples of the method, apparatuses, and non-transitory computer-readable medium described herein, the set of spreading codes of each of the set of codebooks include MCPs, computer generated sequences (CGSs), pseudo-random noise (PN) sequences, or combinations thereof.

DETAILED DESCRIPTION

Figure 1:
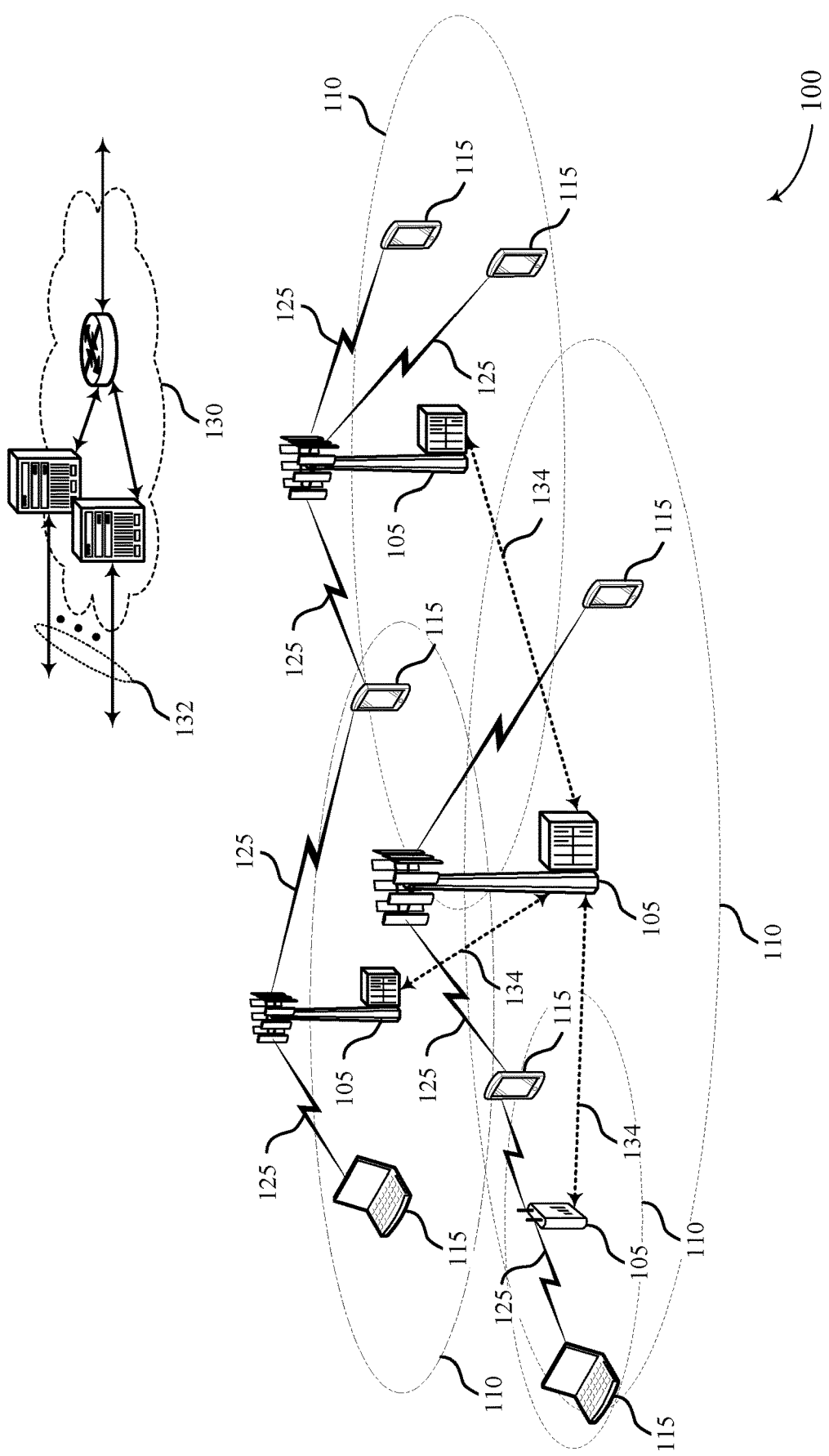
FIG. 1 illustrates an example of a system for wireless communications that supports non-orthogonal multiple access (NOMA) hopping pattern techniques for spreading sequences in accordance with aspects of the present disclosure.

Some wireless communications systems may support multiple access techniques for multiple users by sharing available system resources (e.g., time, frequency, and spatial resources). Such multiple access techniques may include non-orthogonal multiple access (NOMA) techniques that enhance achievable spectral efficiency (SE) and reduce signaling overhead in a system and may outperform orthogonal multiple access (OMA) techniques, by allowing multiple different concurrent transmissions over common time, frequency, and spatial resources.

Various aspects of the present disclosure provide multiple access (MA) signatures for use by a transmitter (e.g., a transmitter that supports NOMA communications), such as a user equipment (UE), that may be based on a sequence of spreading codes and a hopping pattern that is applied to spreading codes of the sequence of spreading codes. A receiver, such as a base station may receive multiple concurrent transmissions from multiple different UEs, and the MA signature applied to each of the multiple concurrent transmissions may help to identify a particular UE from the multiple different UEs. In some cases, the MA signature may be based at least in part on a UE-specific hopping pattern that is applied to a sequence of spreading codes. An order of spreading codes in the spreading code sequence may be determined based on the UE-specific hopping pattern, and may be applied, in some cases, to each layer of a multi-layer NOMA transmission.

In some cases, the sequence of spreading codes may be associated with a group of UEs, and each UE may apply a UE-specific hopping pattern. The UE-specific hopping patterns may be configured to provide relatively low cross-correlation between pairs of hopping patterns for UEs within the group (e.g., pair-wise cross correlation may be below a threshold value), which may help improve receiver performance and reduce receiver complexity in a system through faster convergence of iterative signal processing and thus reduced processing latency and complexity relative to cases with higher pair-wise cross correlation.

Transmitter side data processing for NOMA may be based on, for example, bit-level scrambling, weighted multi-layer transmissions, symbol level spreading, symbol level scrambling, or combinations thereof. In some cases, the sequence of spreading codes may be applied to portions of a communication (e.g., a NOMA communication) to provide symbol level spreading (e.g., based on blocks of modulation symbols or based on an inverse fast Fourier transform (IFFT) blocks). In some examples, a NOMA communication may include a random access message (e.g., including a random access channel (RACH) message, such as MsgA of a two-step RACH procedure). The sequence of spreading codes, in some cases, may be one of a set of spreading codes associated with a group of UEs, and the UE-specific hopping pattern in combination with the sequence of spreading codes may provide the MA signature that a NOMA receiver may use to differentiate different NOMA transmitters. In some cases, the UE-specific hopping pattern and spreading code sequence may be applied to a superimposed multi-layer NOMA signal, and the MA signature may be used to help decode such multi-layer NOMA transmissions.

A receiver, such as a base station, that receives multiple concurrent transmissions on common time, frequency, and spatial resources may demodulate and decode such transmissions according to techniques (e.g., NOMA techniques) that enable the recovery of multiple simultaneous transmissions. Such NOMA techniques include, for example, resource spread multiple access (RSMA), successive interference cancellation (SIC), parallel interference cancellation (PIC), hybrid interference cancellation (HIC), multi-user decoders (MUDs), or combinations thereof. A MUD may use SIC techniques to decode a first, relatively strong, signal from a first transmitter, subtract the first signal from the received signal, decode a second signal from a second transmitter, and so on. RSMA techniques may utilize lower rate channel coding and symbol level hybrid spreading and scrambling, which expands the occupied resources of a transmitted signal across one or multiple resources. Gains obtained from RSMA transmission schemes may lead to robust transmissions at lower signal to interference and noise ratio (SINR), and also may be well suited for sporadic transmissions of small non-orthogonal data bursts without perfect time and frequency synchronization. For example, RSMA techniques may be beneficial in systems that support machine type communication (MTC), enhanced MTC (eMTC), massive MTC (mMTC) communications, narrow-band Internet of Things (NB-IoT) communications, ultra-reliability low latency communications (URLLC), enhanced mobile broadband (eMBB) communications, and the like. In such cases, signals from multiple transmitting devices within a NOMA transmission interval may be recovered simultaneously, even in the presence of mutual interference.

As described herein, through the use of NOMA techniques, greater receiver reliability and reduced complexity in receiving concurrent NOMA transmissions may be provided through relatively low cross correlation between multiple access (MA) signatures of each NOMA transmitter. Such enhanced reliability and reduced complexity provide power savings, latency reduction, and signaling overhead reduction. Further, various techniques may provide relatively low signaling overhead through the use of a preconfigured set of codebooks with spreading sequences and hopping patterns, and signaling of a particular sequence of spreading codes and hopping pattern through index values into the set of codebooks. In some examples, some wireless resources may be made available for NOMA transmissions in a grant-free configuration (e.g., periodic subframes or slots within a set of time resources may be available for NOMA transmissions), which may enhance system efficiency and capacity by reducing overhead associated with scheduling requests and specific grants that may otherwise be communicated between a UE and a base station. Additionally, such reduced signaling may reduce power consumption and latency of a system.

Aspects of the disclosure are initially described in the context of a wireless communications system. Aspects of the disclosure are further illustrated by and described with reference to apparatus diagrams, system diagrams, and flowcharts that relate to NOMA hopping pattern techniques for spreading sequences.

FIG. 1 illustrates an example of a wireless communications system 100 that supports NOMA hopping pattern techniques for spreading sequences in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. In some cases, base stations 105 and UEs 115 may communicate using NOMA transmissions in which multiple UEs 115 may concurrently transmit uplink communications to a base station 105 using common time, frequency, and spatial resources.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling or pre-configuration of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents, such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, for example, in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may, in some cases, perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30,720,000$ seconds. Time intervals of a communications resource may be organized according to radio frames each having a duration of 10 milliseconds (ms), where the frame period may be expressed as $T_f = 307,200 T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or discrete Fourier transform spread OFDM (DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum and, in some examples, the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

In some cases, one or more UEs 115 may be configured for NOMA transmissions, and may be configured with multiple NOMA transmission layers that are available for one or more concurrent NOMA transmissions. In some cases, such UEs 115 may apply a MA signature to an uplink NOMA transmission over communication link 125, which may be based at least on a sequence of spreading codes associated with a group of UEs 115 and a UE-specific hopping pattern. Such a UE 115 may determine a sequence of spreading codes for a NOMA transmission, and then the UE-specific hopping pattern may be applied to the sequence of spreading codes.

A base station 105 may receive multiple concurrent transmissions over communication link 125 from multiple different UEs 115, and use the MA signature applied to each of the multiple concurrent transmissions in to help identify a particular UE 115 of the multiple UEs 115 that had concurrent transmissions to the base station 105. The sequence of spreading codes according to the hopping patterns may be applied, in some cases, to each layer of a multi-layer NOMA transmission.

Figure 2:
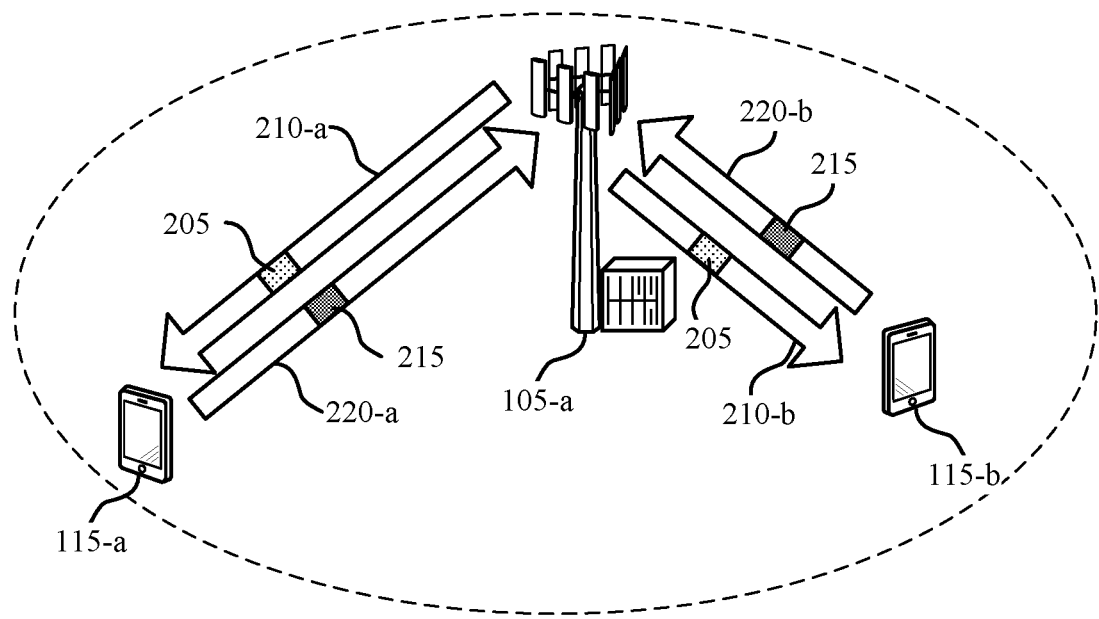
FIG. 2 illustrates an example of a wireless communications system that supports NOMA hopping pattern techniques for spreading sequences in accordance with aspects of the present disclosure.
Figure 2:
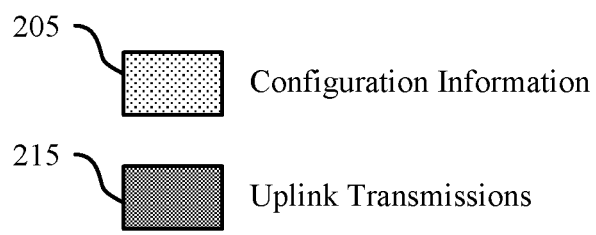

FIG. 2 illustrates an example of a wireless communications system 200 that supports NOMA hopping pattern techniques for spreading sequences in accordance with aspects of the present disclosure. In some examples, wireless communications system 200 may implement aspects of wireless communications system 100. In the example of FIG. 2, the wireless communications system 200 may include base station 105-a, which may be an example of a base station 105 of FIG. 1. The wireless communications system 200 may also include first UE 115-a and second UE 115-b, which may each be examples of a UE 115 of FIG. 1, that are located within coverage area 110-a of base station 105-a.

The UEs 115 may be configured for NOMA transmissions that may use one or more NOMA transmission branches (e.g., according to multi-layer (ML) RSMA transmission techniques). For example, UEs 115 may receive NOMA configuration information 205, via downlink carriers 210 and may transmit concurrent NOMA uplink transmissions 215 using common NOMA uplink resources via uplink carriers 220. In some cases, NOMA uplink transmissions 215 may allow the UEs 115 to autonomously transmit uplink transmissions in the absence of a specific grant of uplink resources to the UE 115 (i.e., in grant-free transmissions). Such grant-free uplink transmissions may significantly reduce downlink overhead of the wireless communications system 200. Further, as the number of UEs 115 in a system increase (e.g., in some IoT deployments, numerous UEs 115 may be present in a coverage area of base station 105-a) and relatively small amounts of data are transmitted in uplink transmissions, the overhead of downlink control information (DCI) that provides grants for the uplink traffic may also increase. Thus, NOMA techniques may allow concurrent transmissions from UEs 115, and may allow the UEs 115 to transmit NOMA uplink transmissions 215 in the absence of an uplink grant, and may thus increase network efficiency. Further, spectral efficiency may be further increased by using multiple NOMA transmission branches, and various techniques provided herein may allow a UE 115 to apply a MA signature to a NOMA transmission to enhance reliability and increase the likelihood of successful decoding of the NOMA transmission at the base station 105-a.

In some cases, each of the UEs 115 may transmit concurrent uplink transmissions via the same uplink resources that are each based on a MA signature. NOMA processing may be performed in each of the UEs 115 to apply the MA signature, which may include a sequence of spreading codes having a UE-specific hopping pattern applied thereto. In some cases, MA signatures used by each UE 115 may have desired cross-correlation properties that provide for enhanced differentiation of transmissions from different UEs 115 at the base station 105-a.

As indicated above, various aspects of the present disclosure provide UE-specific hopping patterns that are applied to sequences of spreading codes in a symbol-level spreading operation. Providing a hopping pattern to a sequence of spreading codes may allow for enhanced differentiation of different transmitters at a NOMA receiver. In some cases, one or more codebooks of spreading codes may be determined according to a technique that achieves Welch bound equality based on sum squared cross correlations. However, in some cases, such as in cases where a closed-form formula is used to generate the NOMA spreading code sequences, Welch bound equality on pair-wise cross correlations may not be satisfied. Reducing average pair-wise cross correlations across transmission symbols can improve the receiver performance with SIC techniques, which may be desirable as such techniques may allow processing of concurrent NOMA signals from multiple transmitters NOMA that arrive with relatively large timing offsets and/or power offsets. Hopping patterns in accordance with various techniques as discussed herein may help provide reduced pair-wise cross correlations which, as indicated, may improve the system performance as well as to reduce the complexity of interference cancellation. In some cases, each UE 115 may periodically change the spreading code sequence in time for different modulation symbols or different OFDM symbols. In some cases, a group of UEs 115 may be configured with a common pool of spreading codes, and UE 115 specific and time-varying hopping of spreading codes may be represented by the periodical change of a sequence index of spreading codes, which is referred to herein as a hopping pattern. Various techniques discussed herein provide a systematic construction of hopping patterns for NOMA spreading codes.

Figure 3:
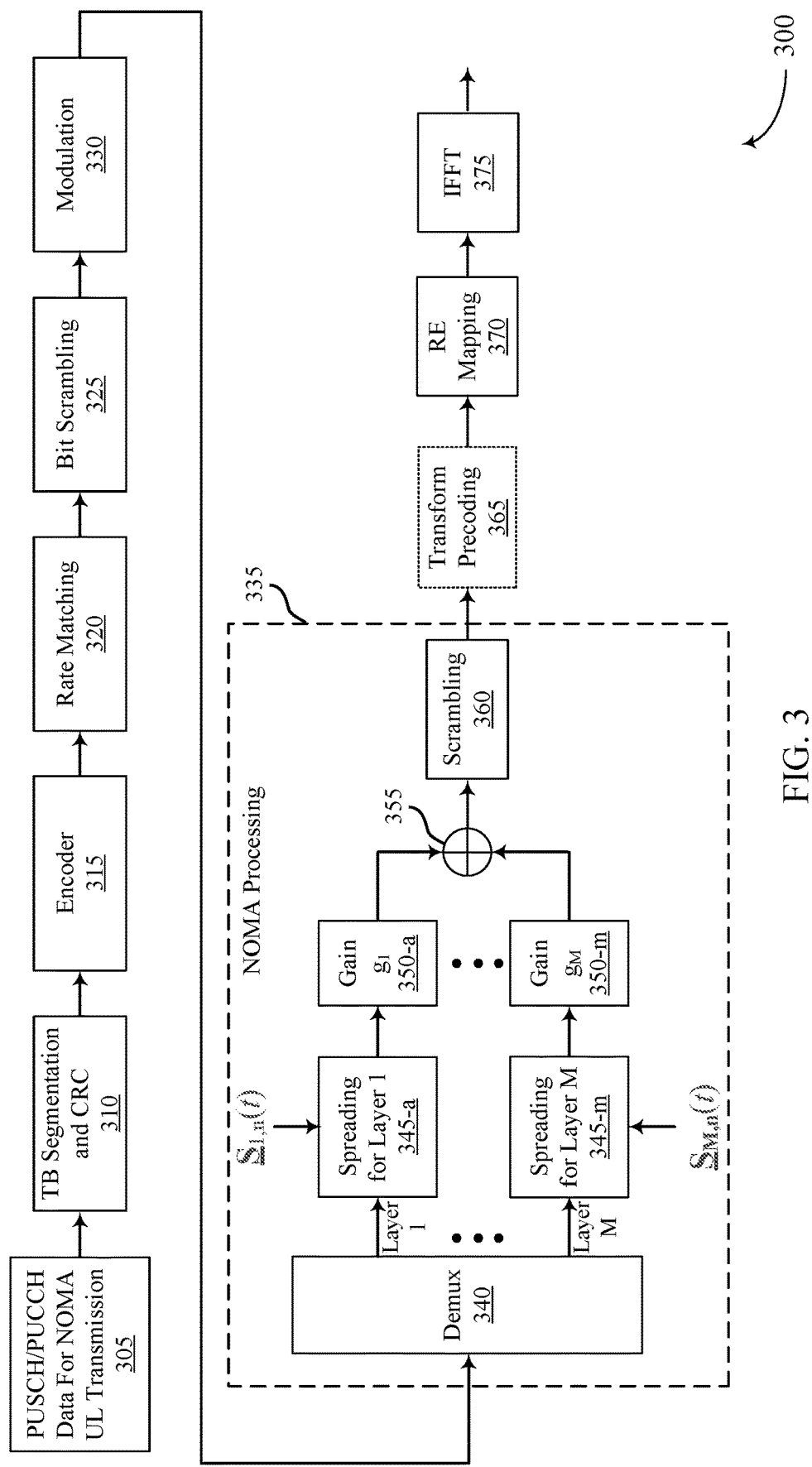
FIG. 3 illustrates an example of a NOMA transmit chain that supports NOMA hopping pattern techniques for spreading sequences in accordance with aspects of the present disclosure.

FIG. 3 illustrates an example of a NOMA transmit chain 300 that supports NOMA hopping pattern techniques for spreading codes in accordance with aspects of the present disclosure. In some examples, NOMA transmit chain 300 may implement aspects of wireless communications system 100 or 200. In the example NOMA transmit chain 300 of FIG. 3, the UE may use multi-branch NOMA processing (i.e., M>1). In such cases, PUSCH/PUCCH data 305 may be provided to a transmit chain at the UE, which may perform initial transmit processing. The transmit chain may include a transport block (TB) segmentation and cyclic redundancy check (CRC) component 310, an encoder 315 (e.g., low density parity check (LDPC) encoder), rate matching component 320, bit scrambling component 325, and modulation component 330 (e.g., a BPSK, pi/2 BPSK, QPSK, OQPSK, 16QAM, 64QAM modulation component).

The output from the initial transmit processing, in this example, is provided to a NOMA processing portion 335 of the UE transmit chain 300. The NOMA processing portion 335 may include a demultiplexer 340, which may demultiplex the modulated data into M separate transmission streams, with each transmission stream provided to a separate NOMA branches or layers for processing. In the example of FIG. 3, each NOMA layer may include a spreading component 345, and a gain component 350. The outputs of each of the branches may be superimposed at summing component 355 to generate a combined signal that is then scrambled at scrambling component 360. In some cases, optional transform precoding component 365 may perform transform precoding on the output of the scrambling component 360, and a RE mapping component 370 may map the precoded symbols to REs. The mapped REs may be provided to IFFT component 375 for uplink transmission.

In some cases, different NOMA transmission branches may apply a different spreading sequence at spreading components 345. In some cases, the spreading components 345 may spread an incoming symbol across multiple symbols, such as by repeating symbols, for transmission according to a spreading sequence. In some cases, a sequence of spreading codes $S_{m,n}(t)$ may be applied at each spreading component 345, with $S_{1,n}(t)$ applied at a first layer spreading component 345-a and with $S_{M,n}(t)$ applied at $M^{th}$ layer spreading component 345-m. The sequence of spreading codes $S_{m,n}(t)$ may be a function of time and may indicate the spreading code used at time instant t by UE n on layer m. Thus, UE-n "hops" its M-layer spreading codes $\{S_{m,n}(t), 1 \le m \le M\}$ as a function t. In some cases, the sequence of spreading codes $S_{m,n}(t)$ may provide spreading that is unique to the UE and transmission layer, such that a receiving device (e.g., a base station) may distinguish ML-RSMA transmissions from multiple UEs using the same resources, such as by NOMA techniques. As discussed herein, a UE-specific hopping pattern may be applied, with a sequence of spreading codes, to jointly provide a MA signature for an uplink NOMA transmission.

In some cases, scrambling component 360 may apply a scrambling sequence to each spread data symbols for transmission. Such a scrambling sequence may be a particular symbol level scrambling code that is applied to each spread symbol for transmission such that may further assist a receiving device (e.g., a base station) in distinguishing multi-layer resource spreading multiple access (ML-RSMA) transmissions from the multiple NOMA transmitters. The gain components 350 may apply different complex gain factors $\{g_1, \ldots, g_M\}$ to each branch of the multi-branch NOMA processing.

In some cases, a UE may be configured with multiple codebooks of sequences of spreading codes and associated hopping patterns that may provide UE-specific hopping patterns that are to be applied to sequences of spreading codes. In some cases, a spreading code may be an example of a multiple access signature. In some cases, a particular codebook, and sequence of spreading codes, may depend on one or more parameters, such as a layer index, a number of layers, an identification of the UE, a UE group identification, a spreading factor applied to the layer, a cell ID of the serving base station, slot index of a transmission, a symbol index, different TBSs, different spreading factors, different transmission powers, different MCSs, different buffer states, or combinations thereof. In some cases, the UE may determine the sequence of spreading codes based on signaling from a base station (e.g., RRC may configure a set of codebooks and DCI signaling may indicate one or more index values to identify a codebook and sequence for a particular uplink transmission). The UE may also determine the sequence of spreading codes and the UE-specific hopping pattern to be applied based on the signaling, and the receiving base station may use the same parameters to differentiate different MA signatures and to decode the NOMA transmissions.

In some cases, the IFFT component 375 may perform an inverse fast Fourier transform on frequency domain signals provided by the RE mapping component 370 to generate a time domain waveform, such as a NOMA CP/DFT-s-OFDM waveform for uplink transmission. The UE may transmit the waveform via power amplifiers and antennas to a base station using the frequency and time resources identified for the uplink transmission of the uplink data. A base station receiving NOMA uplink transmission may decode each of the NOMA transmission branches in accordance with UE and layer specific MA signatures. Different MUD and interference cancellation techniques may be applied by the receiver.

In some cases, as indicated above, a sequence of spreading codes and a hopping pattern may be determined based on a preconfigured pool of spreading codes (e.g., in one or more codebooks of sequences of spreading codes). In some cases, spreading codes may be generated according to a closed-form formula, or determined from a look-up table. In some cases, each UE may use multiple spreading codes as well a UE-specific hopping pattern. For example, NOMA UE-A and UE-B may transmit concurrent uplink NOMA communications using single layer symbol spreading. In such a case, UE-A may use two NOMA spreading codes $[S_1 S_2]$ periodically, and UE-B may use another set of spreading codes $[S_2 S_3]$ periodically. The cross-correlation between single-code pair $S_1$ vs $S_2$ and $S_2$ vs $S_3$ may be different, but the cross-correlation between multi-code pair may be equalized, which may equalize inter-UE interference and enhance reception and decoding reliabilities of the concurrent communications, as UE separation may be based on the joint processing of multi-codes and hopping patterns. In some cases, the symbol level spreading may be applied to both CP-OFDM and DFT-s-OFDM waveforms. Further, as indicated above, the periodicity and pattern of hopping may be pre-configured. In some cases, relatively fast hopping may be performed in which spreading codes may be changed across one or multiple blocks of modulation symbols (size M) at the output of demultiplexer 340. In other cases, relatively long hopping may be performed with hopping done across one or multiple IFFT blocks. For a given pool of spreading codes, the hopping patterns may be selected to average out the pair-wise inter-UE interference across a sequence of modulation symbols.

Figure 4:
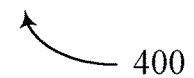
FIG. 4 illustrates an example of a hopping pattern configuration for spreading sequences in accordance with aspects of the present disclosure.

FIG. 4 illustrates an example of a hopping pattern configuration table 400 for spreading sequences in accordance with aspects of the present disclosure. In some examples, hopping pattern configuration table 400 may implement aspects of wireless communications system 100 or 200. In this example, an initial sequence of spreading codes may be determined for a set of modified chirp sequence (MCP)

codes. For example, an MCP codebook may have a spreading factor K and size N, where N=MK and M>1 is a positive integer. The initial sequence of spreading codes, for example, indicated as hop 0 in the hopping pattern configuration table 400, may have an MCP code $S_n$ assigned to group n, and a UE may be signaled to be in a particular group of UEs and may determine the initial sequence based on the group indication.

For a first hop (hop 1), the initial sequence of spreading codes may be modified based on a formula that may be used to determine the sequence assignment of MCP codes. In some examples, for an odd group index n (i.e., mod(n, 2)=1), an MCP code may be assigned with index n'=mod(n−M, N). In such examples, for an even group index n (i.e., mod(n, 2)=0), an MCP code may be assigned with index n'=mod(n+M, N). When N is odd, the MCP code index of group N may be reset as shown in the row for hop 1 in the hopping pattern configuration table 400. For additional hops (i.e., Hop (m+1), m≥1), a cyclic shift of the sequence index may be performed based on the previous sequence of MCP codes assigned to N UEs, such as illustrated in the row for hop 2 in the hopping pattern configuration table 400. Such MCP sequences and hopping patterns may allow for relatively efficient configuration and signaling to UEs, as the sequences and hopping patterns may be efficiently signaled by a base station (e.g., via RRC signaling or a DCI signaling of a group index value from the base station that activates or refines the pre-configured hopping patterns of spreading codes associated with a group of UEs).

Figure 5:
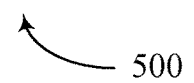
FIG. 5 illustrates another example of a hopping pattern configuration for spreading sequences in accordance with aspects of the present disclosure.

FIG. 5 illustrates another example of a hopping pattern configuration table 500 that supports NOMA hopping pattern techniques for spreading sequences in accordance with aspects of the present disclosure. In some examples, hopping pattern configuration table 500 may implement aspects of wireless communications system 100 or 200. In this example, an initial sequence of spreading codes may be determined for CGS or PN sequences. For example, a number of CGS or PN sequences may be sorted according to the maximal or minimal values of pair-wise cross-correlations, with the resulting sequence index of sorted sequences indicated by $[k_1\ k_2\ k_3\ \ldots\ k_N]$, as indicated in the row for hop 0 in the hopping pattern configuration table 500. In this example, flipping and cyclic shifting the index may be used to configure the hopping pattern. In the example of FIG. 5, the sorted sequence index may be flipped for a first hop, as indicated in the row for hop 1 in the hopping pattern configuration table 500. Subsequent hops may use cyclic shifts of the sequence index of previous hop to obtain other sequences of spreading codes, such as indicated in the row for hop 3 in hopping pattern configuration table 500.

Figure 6:
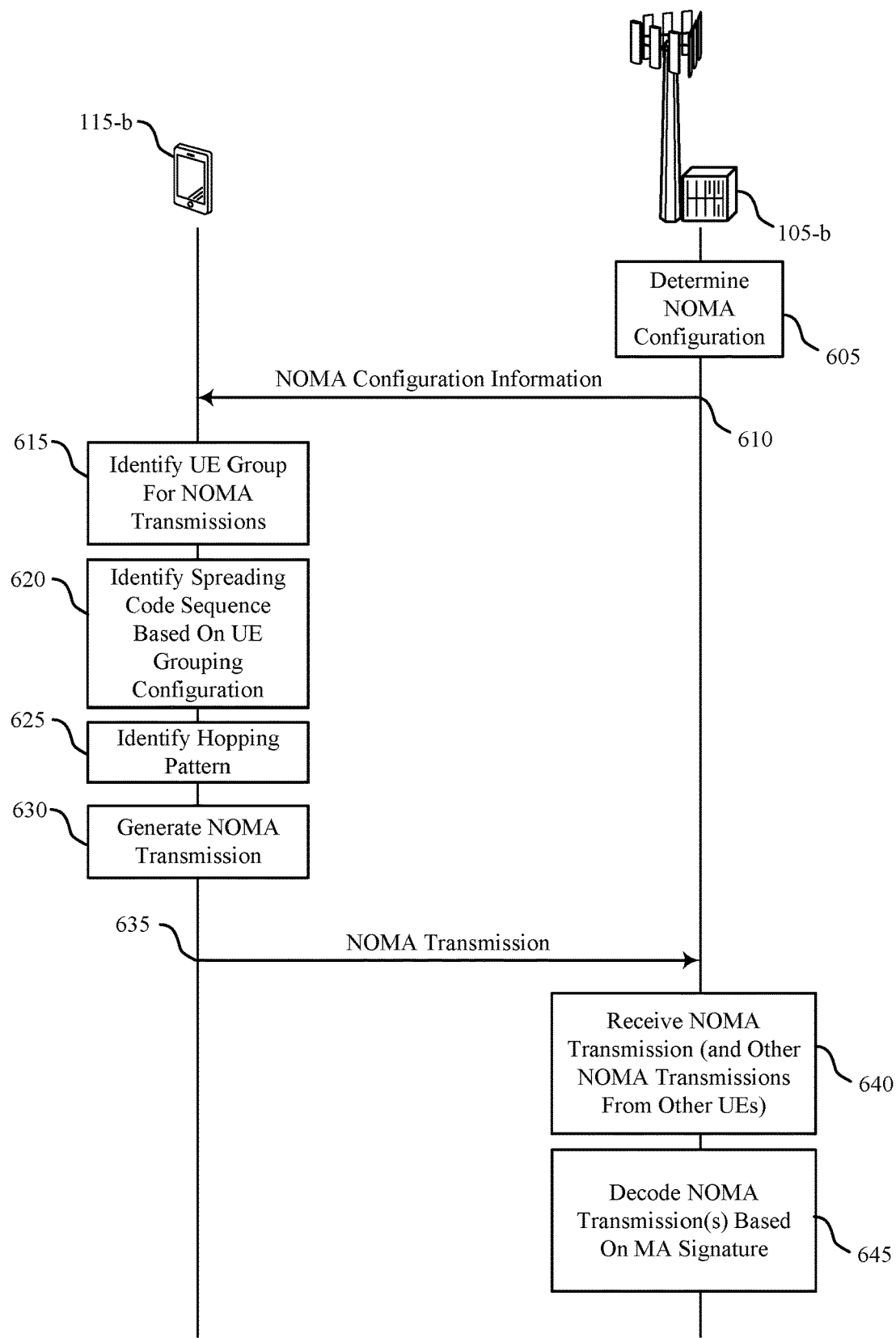
FIG. 6 illustrates an example of a process flow that supports NOMA hopping pattern techniques for spreading sequences in accordance with aspects of the present disclosure.

FIG. 6 illustrates an example of a process flow 600 that supports NOMA hopping pattern techniques for spreading sequences in accordance with aspects of the present disclosure. In some examples, process flow 600 may implement aspects of wireless communications system 100 or 200. Process flow 600 includes UE 115-*b* and base station 105-*b*, which may be respective examples of a UE 115 and a base station 105 as described herein.

The base station 105-*b* in this example, at 605, may determine a NOMA configuration for uplink NOMA transmissions from a number of UEs. The NOMA configuration may include, for example, sequences of spreading codes and hopping patterns, which may be used for determining spreading that is to be applied to uplink NOMA communications. The NOMA configuration may be based on various parameters, such as a number of UEs that may potentially transmit NOMA uplink transmissions, SE, reliability, or latency requirements of the UEs, resources available for NOMA transmissions, capabilities of UEs that are served by the base station 105-*b*, and the like.

In some cases, the NOMA configuration information may include MA signature configuration information. For example, the NOMA configuration may include an indication of a number of codebooks that may be used to determine a MA signature for uplink NOMA transmissions. For example, the codebooks may provide a number of sets of spreading codes that may be associated with a UE-specific hopping pattern, that is to be applied to an uplink NOMA transmission. In some cases, a number of different sets of spreading codes may be provided for UE groupings. In some cases, the UE groupings may be based on one or more parameters of the UE 115-*b*, such as, for example, a TBS, MCS, transmission power, UE buffer size, or combinations thereof. The base station 105-*b* may transmit NOMA configuration information 610 to the UE 115-*b*. In some cases, the NOMA configuration information 610 may be provided to the UE 115-*b* via semi-static signaling (e.g., RRC signaling), via other signaling (e.g., via group common PDCCH, SIB, MIB, RMSI, or SSB), via dynamic DCI, or combinations thereof.

At 615, the UE 115-*b* may identify a UE group associated with one or more NOMA transmissions. As discussed herein, the UE group may be determined based on one or more parameters of the UE 115-*b*, such as, for example, a TBS, MCS, transmission power, UE buffer size, pathloss of the UE 115-*b* from the base station 105-*b*, or combinations thereof. In some cases, each UE group may be associated with a different sequence of spreading codes that may be used, in conjunction with UE-specific hopping patterns, to generate a MA sequence for an uplink NOMA transmission.

At 620, the UE 115-*b* may identify an initial sequence of spreading codes based on the UE group. In some cases, the UE group, as discussed above, may be determined based on one or more parameters of the UE 115-*b*, such as, for example, a TBS, MCS, transmission power control scheme, UE buffer size, power headroom, pathloss of the UE 115-*b* from the base station 105-*b*, or combinations thereof. The UE group may be determined, in some cases, based on the NOMA configuration information. In some cases, the NOMA configuration may include a number of codebooks in which a particular sequence of spreading codes may be identified for an uplink NOMA transmission.

At 625, the UE 115-*b* may identify a hopping pattern to be applied to the initial sequence of spreading codes. As discussed above, the hopping pattern may be a UE-specific hopping pattern that may be applied to each layer of a multi-layer transmission. In some cases, the hopping pattern may be determined from a set of available hopping patterns and the base station 105-*b* may provide the UE 115-*b* with an index value into the set of available patterns.

At 630, the UE 115-*b* may generate a NOMA transmission. The NOMA transmission may be generated, in some examples, based on a MA signature that is applied at the symbol-level to a NOMA signal jointly by applying the spreading code based on the hopping pattern.

At 640, the base station 105-*b* may receive the NOMA transmission from the UE 115-*b*, as well as concurrent NOMA transmissions from one or more other UEs that are transmitted using common time, frequency, and spatial resources. The base station 105-*b*, in some cases, may identify one or more different NOMA transmissions based at least in part on the MA sequence that is applied to each NOMA transmission.

At 645, the base station 105-b may decode the uplink NOMA transmissions based at least in part on the MA signature associated with the UE 115-b. In some cases, the base station 105-b may perform NOMA demodulation and decoding based on SIC/MUD using NOMA decoding techniques.

Figure 7:
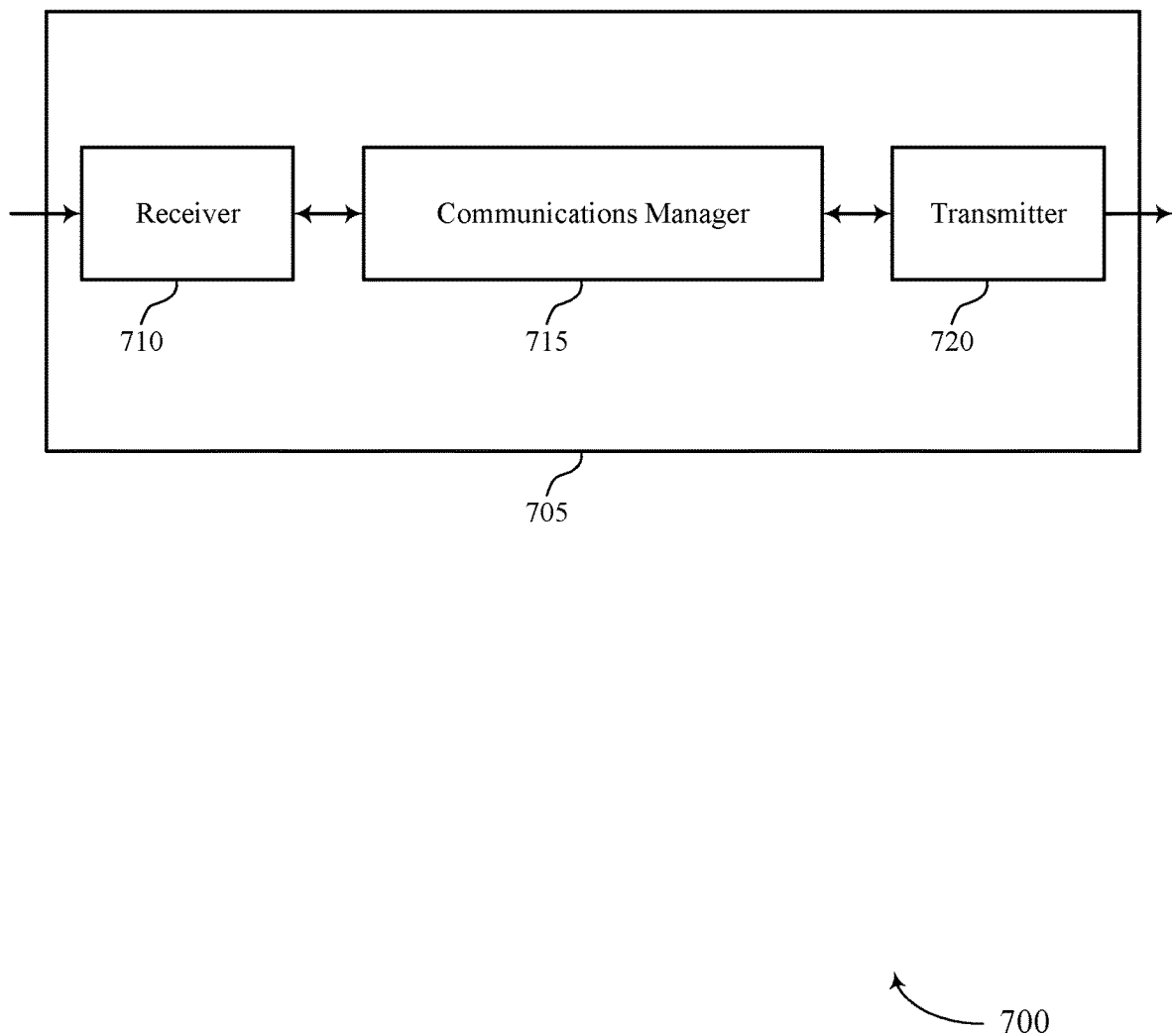
FIGS. 7 and 8 show block diagrams of devices that support NOMA hopping pattern techniques for spreading sequences in accordance with aspects of the present disclosure.

FIG. 7 shows a block diagram 700 of a device 705 that supports NOMA hopping pattern techniques for spreading sequences in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to NOMA hopping pattern techniques for spreading sequences, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may identify a hopping pattern for applying sequences of two or more spreading codes to different portions of an uplink NOMA communication to a base station, apply the sequences of two or more spreading codes to the different portions of the uplink NOMA communication based on the identifying, and transmit the uplink NOMA communication to the base station. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
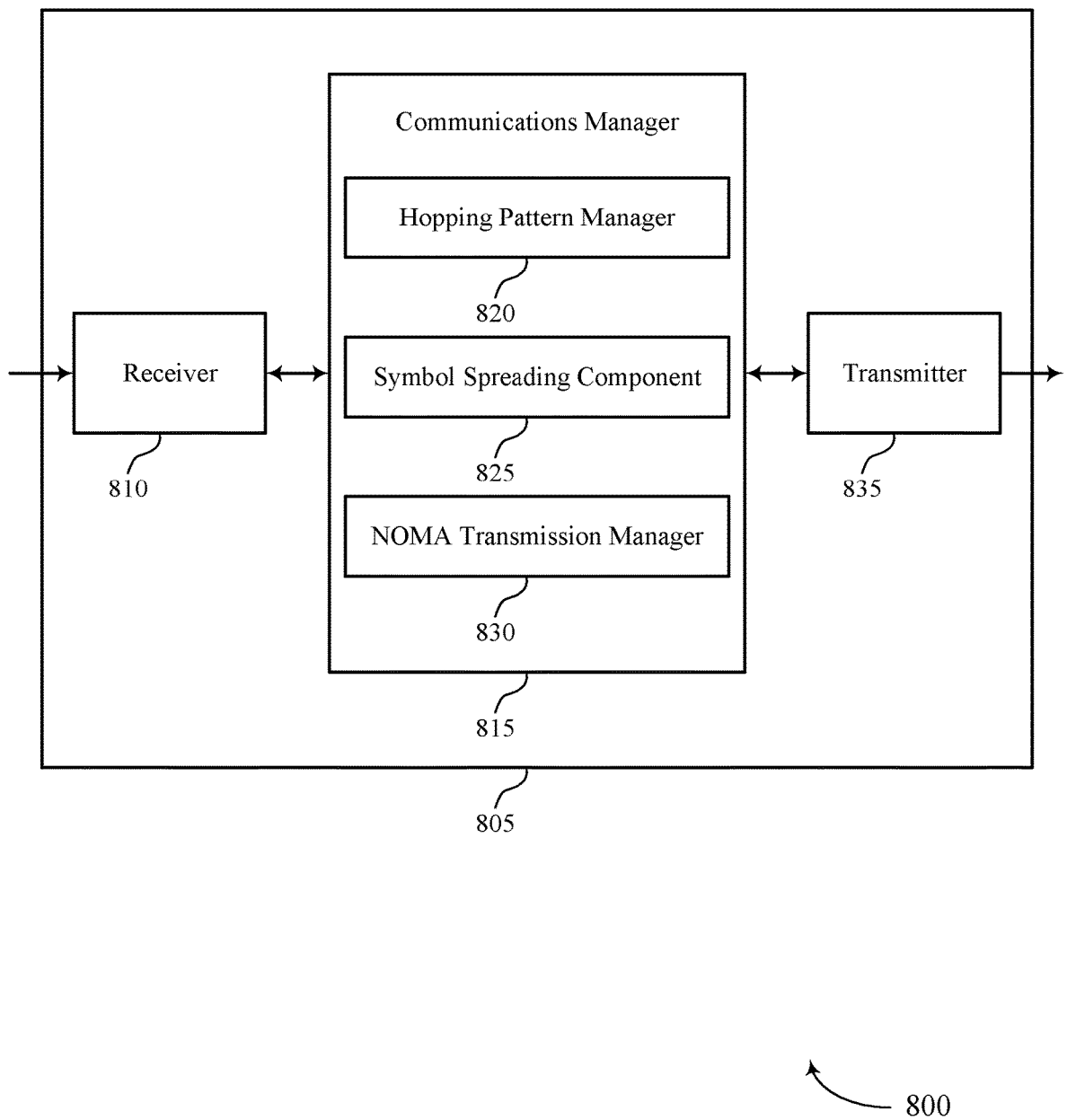

FIG. 8 shows a block diagram 800 of a device 805 that supports NOMA hopping pattern techniques for spreading sequences in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to NOMA hopping pattern techniques for spreading sequences, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a hopping pattern manager 820, a symbol spreading component 825, and a NOMA transmission manager 830. The communications manager 815 may be an example of aspects of the communications manager 1010 described herein.

The hopping pattern manager 820 may identify a hopping pattern for applying sequences of two or more spreading codes to different portions of an uplink NOMA communication to a base station.

The symbol spreading component 825 may apply the sequences of two or more spreading codes to the different portions of the uplink NOMA communication based on the identifying.

The NOMA transmission manager 830 may transmit the uplink NOMA communication to the base station.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
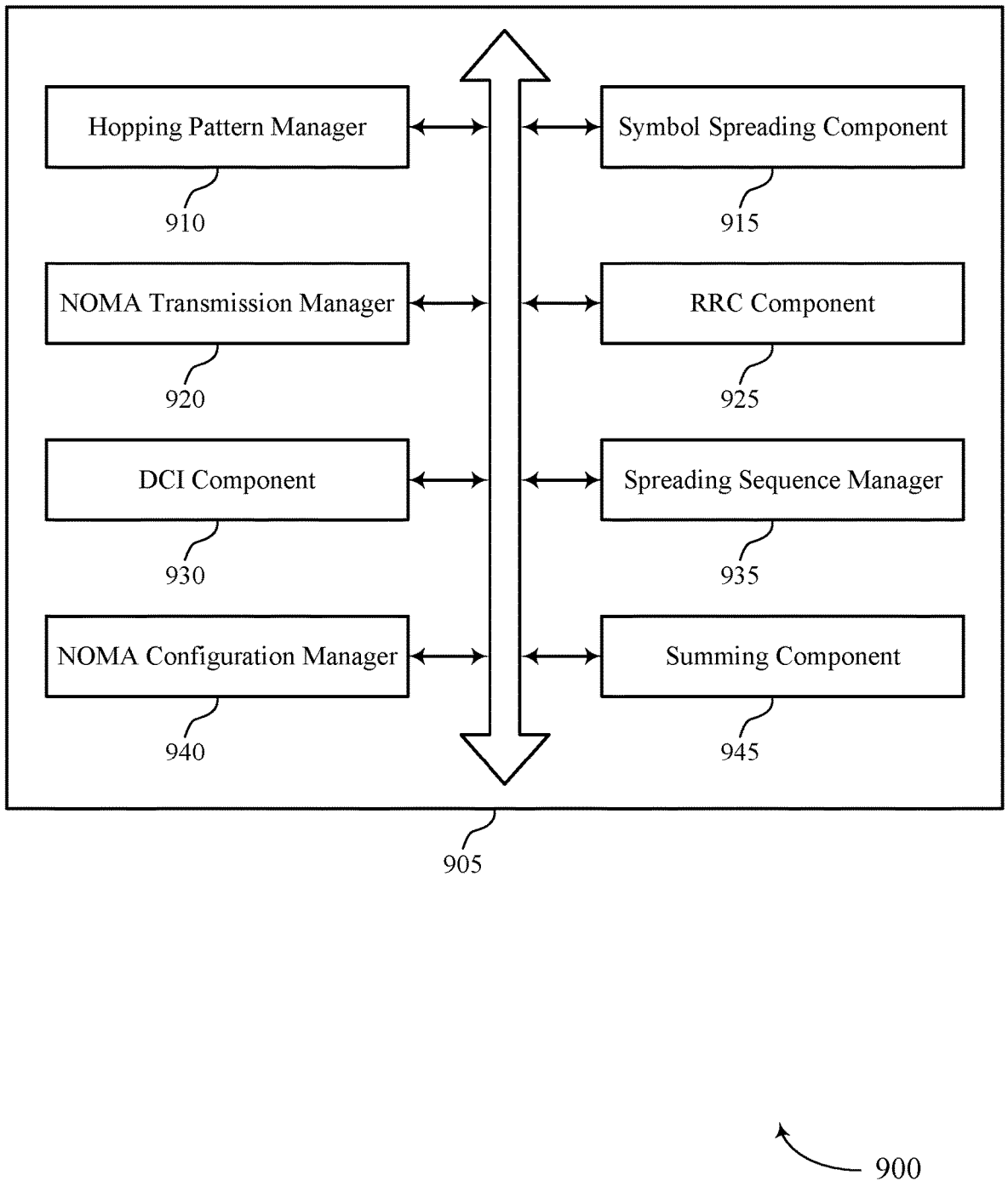
FIG. 9 shows a block diagram of a communications manager that supports NOMA hopping pattern techniques for spreading sequences in accordance with aspects of the present disclosure.

FIG. 9 shows a block diagram 900 of a communications manager 905 that supports NOMA hopping pattern techniques for spreading sequences in accordance with aspects of the present disclosure. The communications manager 905 may be an example of aspects of a communications manager 715, a communications manager 815, or a communications manager 1010 described herein. The communications manager 905 may include a hopping pattern manager 910, a symbol spreading component 915, a NOMA transmission manager 920, an RRC component 925, a DCI component 930, a spreading sequence manager 935, a NOMA configuration manager 940, and a summing component 945. Each of these modules may communicate, directly or indirectly, with one another (e.g., via one or more buses).

The hopping pattern manager 910 may identify a hopping pattern for applying sequences of two or more spreading codes to different portions of an uplink NOMA communication to a base station. In some examples, the hopping pattern manager 910 may apply a first sequence of the two or more spreading codes based on a time instance associated with a first portion of the uplink NOMA communication. In some examples, the hopping pattern manager 910 may determine a second sequence of spreading codes based on the group index value, a number of transmission layers at the UE, and a number of available spreading codes. In other examples, the hopping pattern manager 910 may determine a second sequence of spreading codes as a reversed order of the first sequence of spreading codes. In some examples, the hopping pattern manager 910 may determine a third sequence of spreading codes based on a cyclic shift of the second sequence of spreading codes.

In some cases, the time instance associated with the first portion of the uplink NOMA communication corresponds to a predetermined number of modulation symbols of the uplink NOMA communication. In other cases, the time instance associated with the first portion of the uplink NOMA communication corresponds to a predetermined number of inverse fast Fourier transform (IFFT) blocks of the uplink NOMA communication. In some cases, the hopping pattern and two or more spreading codes form a UE-specific multiple access signature for the uplink NOMA communication, and where a cross-correlation between different UE-specific multiple access signatures is below a threshold value.

The symbol spreading component 915 may apply the sequences of two or more spreading codes to the different portions of the uplink NOMA communication based on the identifying. In some examples, the symbol spreading component 915 may apply the first sequence of spreading codes to a first portion of the uplink NOMA communication. In some examples, the symbol spreading component 915 may apply the second sequence of spreading codes to a second portion of the uplink NOMA communication, and may apply the third sequence of spreading codes to a third portion of the uplink NOMA communication. In some examples, the symbol spreading component 915 may apply a first sequence of spreading codes to each layer of a multi-layer NOMA uplink communication. In some cases, the two or more spreading codes are applied as symbol level spreading to a CP-OFDM or a DFT-s-OFDM waveform.

The NOMA transmission manager 920 may transmit the uplink NOMA communication to the base station. The RRC component 925 may receive RRC signaling from the base station that indicates group indexes of hopping patterns of spreading codes. The DCI component 930 may receive downlink control information that indicates a group index value for the UE.

The spreading sequence manager 935 may identify a first sequence of spreading codes based on the group index value, the first sequence of spreading codes including at least the two or more spreading codes associated with the group of UEs. In some examples, the spreading sequence manager 935 may select the two or more spreading codes from the codebook based on a UE identification or an index value assigned to the UE by the base station. In some cases, the set of spreading codes of each of the set of codebooks include modified chirp sequences (MCPs), computer generated sequences (CGSs), pseudo-random noise (PN) sequences, or combinations thereof.

The NOMA configuration manager 940 may receive multiple access signature configuration information from the base station that indicates the two or more spreading codes and the hopping pattern. In some cases, the multiple access signature configuration information is received from the base station in a master information block (MIB), in a SIB, in remaining minimum system information (RMSI), in a group common PDCCH, in RRC signaling, in dynamic DCI associated with the uplink NOMA communication, or any combination thereof. In some cases, the two or more spreading codes are identified from a codebook of a set of codebooks that each include a set of spreading codes.

The summing component 945 may superimpose each layer of the multi-layer NOMA uplink communication to generate a superimposed NOMA uplink signal.

Figure 10:
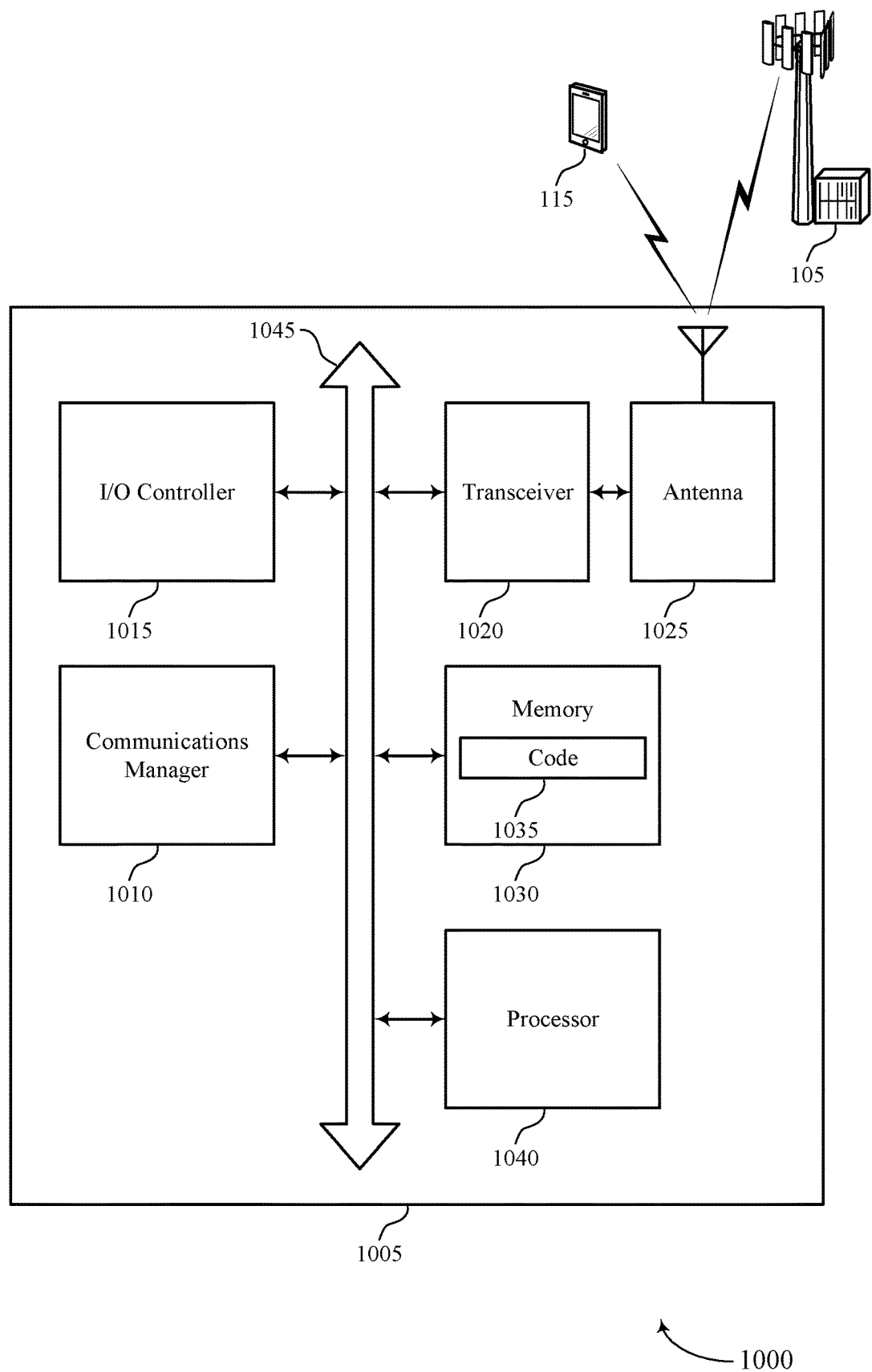
FIG. 10 shows a diagram of a system including a device that supports NOMA hopping pattern techniques for spreading sequences in accordance with aspects of the present disclosure.

FIG. 10 shows a diagram of a system 1000 including a device 1005 that supports NOMA hopping pattern techniques for spreading sequences in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may identify a hopping pattern for applying sequences of two or more spreading codes to different portions of an uplink NOMA communication to a base station, apply the sequences of two or more spreading codes to the different portions of the uplink NOMA communication based on the identifying, and transmit the uplink NOMA communication to the base station.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas. In some cases, the wireless device may include a single antenna 1025. However, in some cases, the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting NOMA hopping pattern techniques for spreading sequences).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
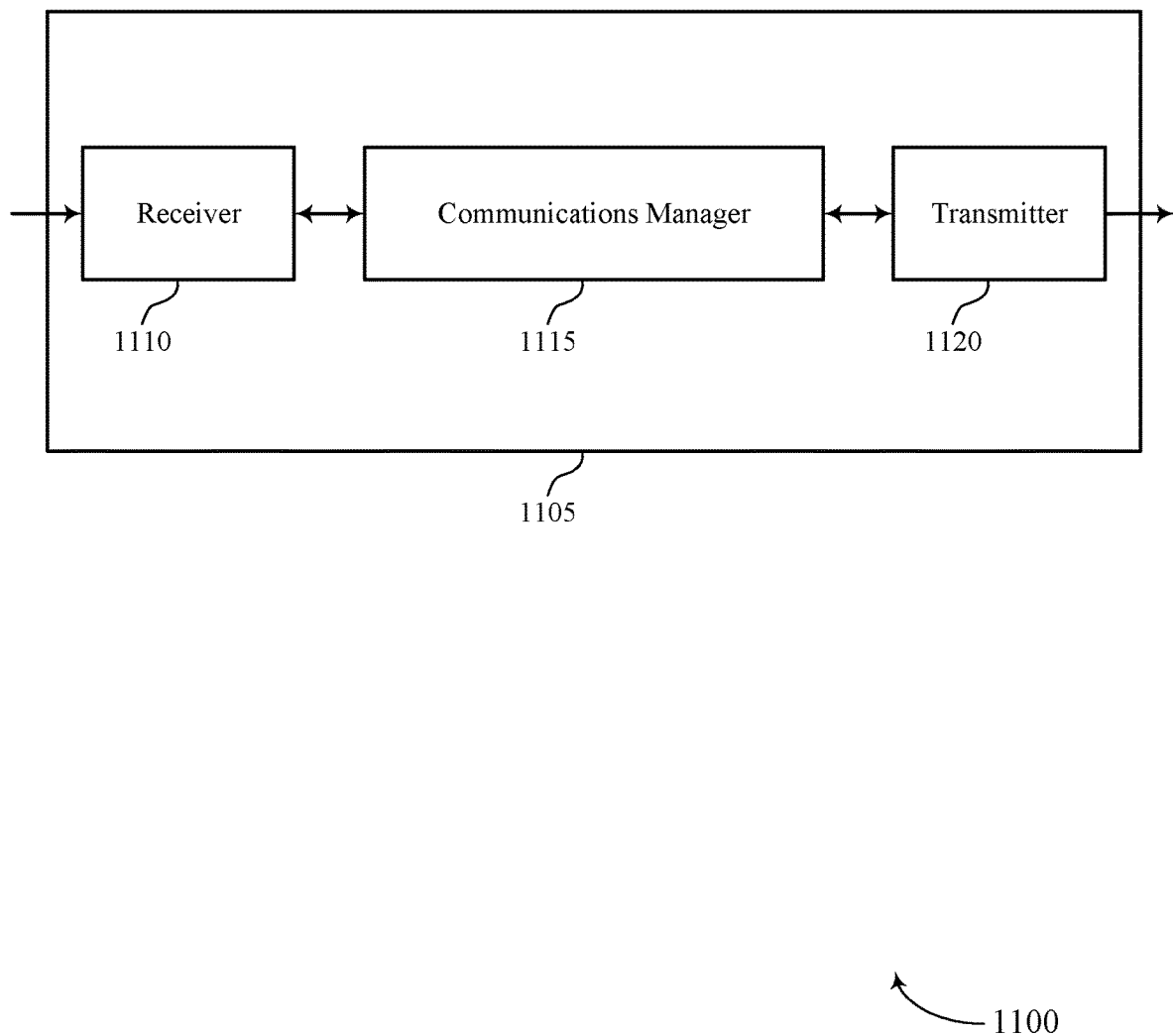
FIGS. 11 and 12 show block diagrams of devices that support NOMA hopping pattern techniques for spreading sequences in accordance with aspects of the present disclosure.

FIG. 11 shows a block diagram 1100 of a device 1105 that supports NOMA hopping pattern techniques for spreading sequences in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to NOMA hopping pattern techniques for spreading sequences, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may identify a set of UEs configured for concurrent uplink NOMA communications and transmit, to the set of UEs, an indication of a multiple access signature to be applied to uplink NOMA communications of each UE of the set of UEs, where the multiple access signature for each UE is based on a sequence of spreading codes and a hopping pattern applied to the sequence of spreading codes for different portions of uplink NOMA communications. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
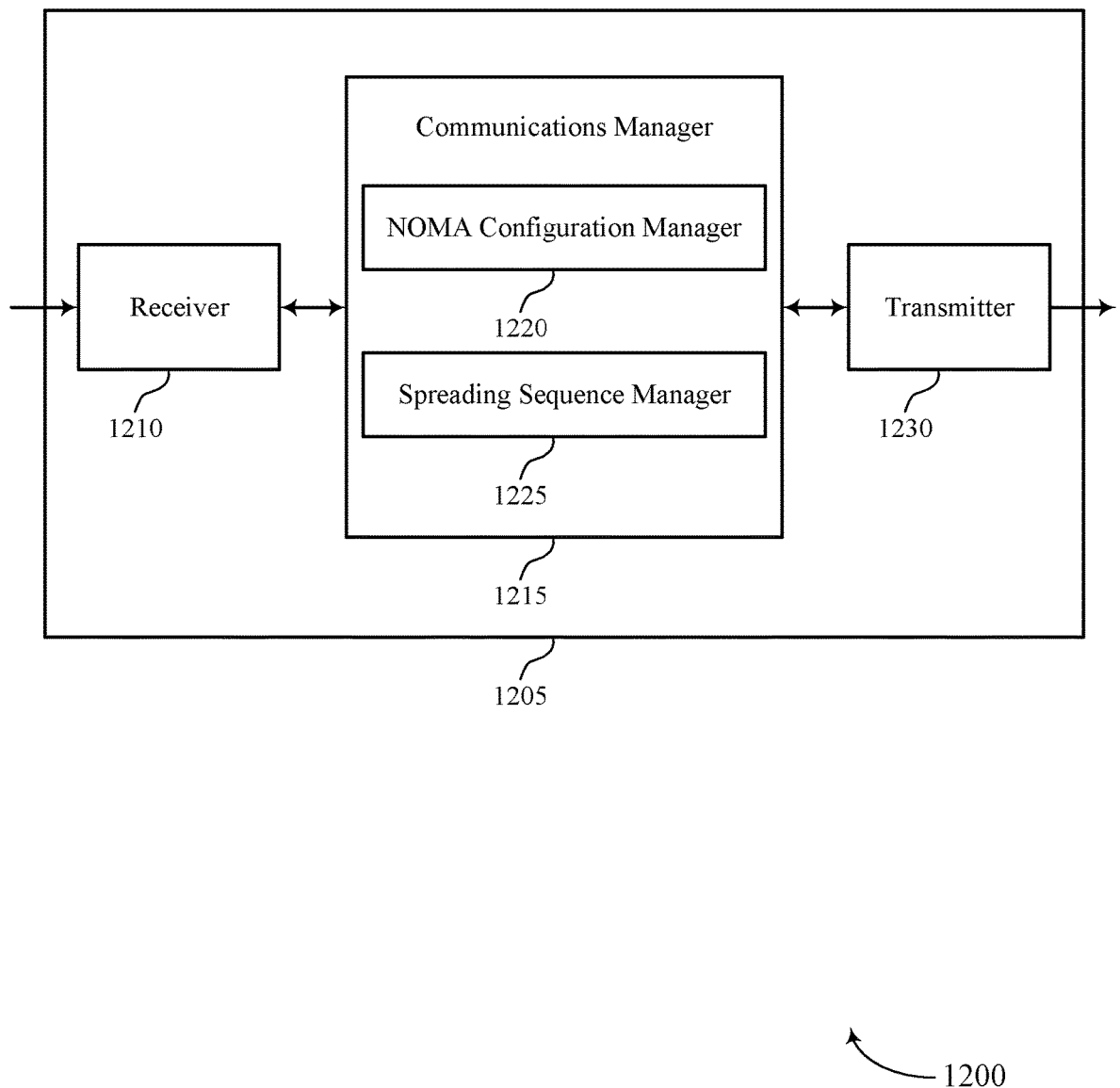

FIG. 12 shows a block diagram 1200 of a device 1205 that supports NOMA hopping pattern techniques for spreading sequences in accordance with aspects of the present disclosure. The device 1205 may be an example of aspects of a device 1105, or a base station 105 as described herein. The device 1205 may include a receiver 1210, a communications manager 1215, and a transmitter 1230. The device 1205 may also include a processor. Each of these components may be in communication with one another (e.g., via one or more buses).

The receiver 1210 may receive information such as packets, user data, or control information associated with various information channels (e.g., control channels, data channels, and information related to NOMA hopping pattern techniques for spreading sequences, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a NOMA configuration manager 1220 and a spreading sequence manager 1225. The communications manager 1215 may be an example of aspects of the communications manager 1410 described herein.

The NOMA configuration manager 1220 may identify a set of UEs configured for concurrent uplink NOMA communications.

The spreading sequence manager 1225 may transmit, to the set of UEs, an indication of a multiple access signature to be applied to uplink NOMA communications of each UE of the set of UEs, where the multiple access signature for each UE is based on a sequence of spreading codes and a hopping pattern applied to the sequence of spreading codes for different portions of uplink NOMA communications.

The transmitter 1230 may transmit signals generated by other components of the device 1205. In some examples, the transmitter 1230 may be collocated with a receiver 1210 in a transceiver module. For example, the transmitter 1230 may be an example of aspects of the transceiver 1420 described with reference to FIG. 14. The transmitter 1230 may utilize a single antenna or a set of antennas.

Figure 13:
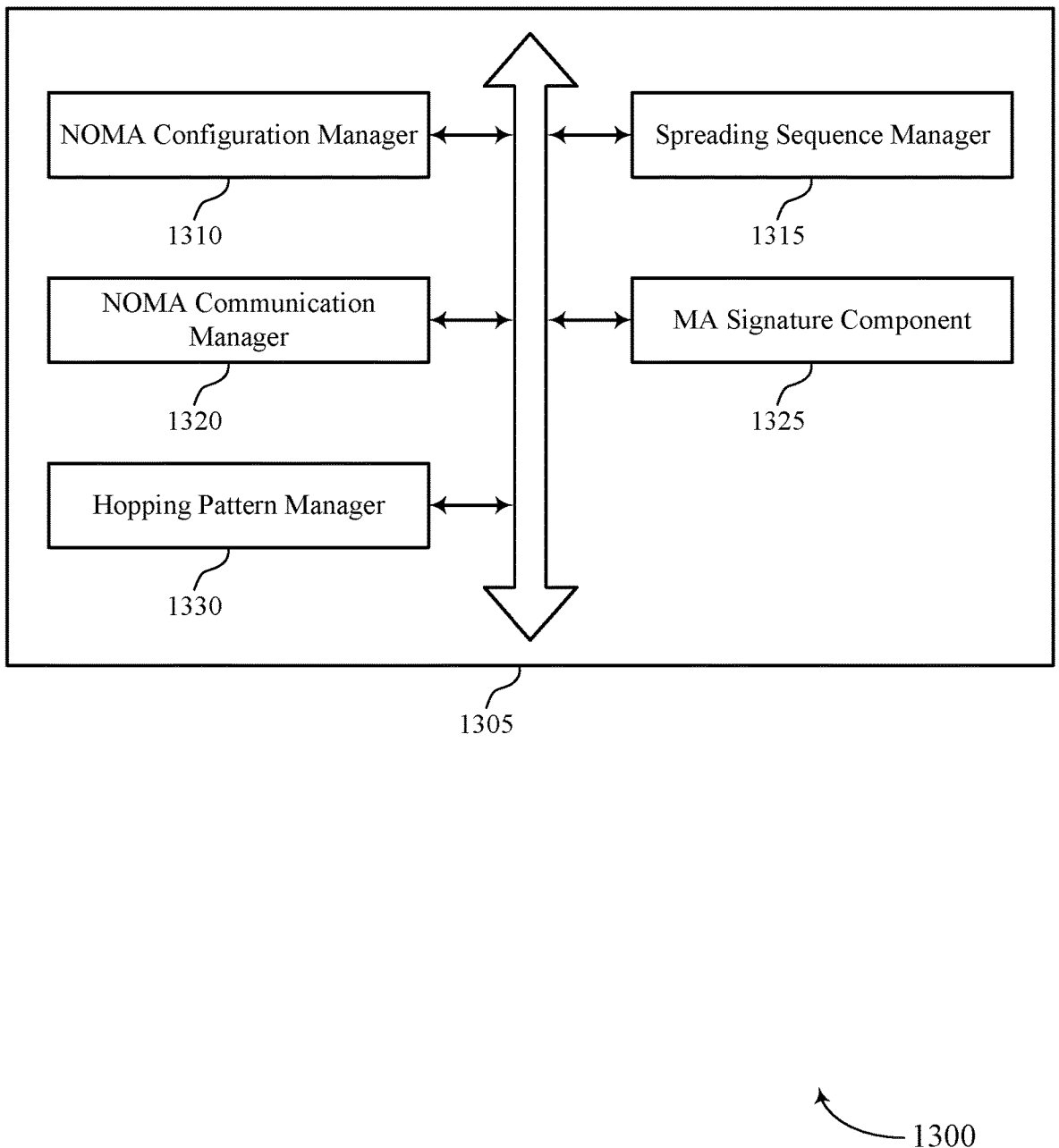
FIG. 13 shows a block diagram of a communications manager that supports NOMA hopping pattern techniques for spreading sequences in accordance with aspects of the present disclosure.

FIG. 13 shows a block diagram 1300 of a communications manager 1305 that supports NOMA hopping pattern techniques for spreading sequences in accordance with aspects of the present disclosure. The communications manager 1305 may be an example of aspects of a communications manager 1115, a communications manager 1215, or a communications manager 1410 described herein. The communications manager 1305 may include a NOMA configuration manager 1310, a spreading sequence manager 1315, a NOMA communication manager 1320, a MA signature component 1325, and a hopping pattern manager 1330. Each of these modules may communicate, directly or indirectly, with one another (e.g., via one or more buses).

The NOMA configuration manager 1310 may identify a set of UEs configured for concurrent uplink NOMA communications. In some examples, the NOMA configuration manager 1310 may sequences of spreading codes are identified from a codebook of a set of codebooks that each include a set of spreading codes. In some cases, the indication of the multiple access signature to be applied to uplink NOMA communications of each UE is transmitted in a master information block (MIB), in a SIB, in remaining minimum system information (RMSI), in a group common PDCCH, in RRC signaling, in dynamic DCI associated with the uplink NOMA communication, or any combination thereof.

The spreading sequence manager 1315 may transmit, to the set of UEs, an indication of a multiple access signature to be applied to uplink NOMA communications of each UE of the set of UEs, where the multiple access signature for each UE is based on a sequence of spreading codes and a hopping pattern applied to the sequence of spreading codes for different portions of uplink NOMA communications. In some cases, the indication of the multiple access signature to be applied at each UE includes a group index value, and where each UE identifies a corresponding sequence of spreading codes based on the group index value. In some cases, the sequence of spreading codes is applied as symbol level spreading to a CP-OFDM or a DFT-s-OFDM waveform. In some cases, the set of spreading codes of each of the set of codebooks include modified chirp sequences (MCPs), computer generated sequences (CGSs), pseudo-random noise (PN) sequences, or combinations thereof.

The NOMA communication manager 1320 may receive at least two concurrent uplink NOMA communications from at least two UEs of the set of UEs using a common set of uplink resources.

The MA signature component 1325 may determine each UE of the set of UEs that transmitted each of the at least two concurrent uplink NOMA communications, based on multiple access signatures that are applied to each of the concurrent uplink NOMA communications.

The hopping pattern manager 1330 may determine a hopping pattern for each UE. In some cases, the hopping pattern of each UE is a function of time and a UE identification, and a first sequence of spreading codes of a first UE is based on a time instance associated with a first portion of the uplink NOMA communication of the first UE. In some cases, the time instance associated with the first portion of the uplink NOMA communication corresponds to a predetermined number of modulation symbols of the uplink NOMA communication. In some cases, the time instance associated with associated with the first portion of the uplink NOMA communication corresponds to a predetermined number of inverse fast Fourier transform (IFFT) blocks of the uplink NOMA communication. In some cases, a second sequence of spreading codes of each UE is based on the group index value, a number of transmission layers at the UE, and a number of available spreading codes. In some cases, a third sequence of spreading codes of each UE is based on a cyclic shift of the second sequence of spreading codes. In other cases, a second sequence of spreading codes is a reversed order of an initial sequence of spreading codes, and a third sequence of spreading codes is based on a cyclic shift of the second sequence of spreading codes. In some cases, the hopping pattern and two or more spreading codes form a UE-specific multiple access signature for the uplink NOMA communication, and where a cross-correlation between different UE-specific multiple access signatures is below a threshold value.

Figure 14:
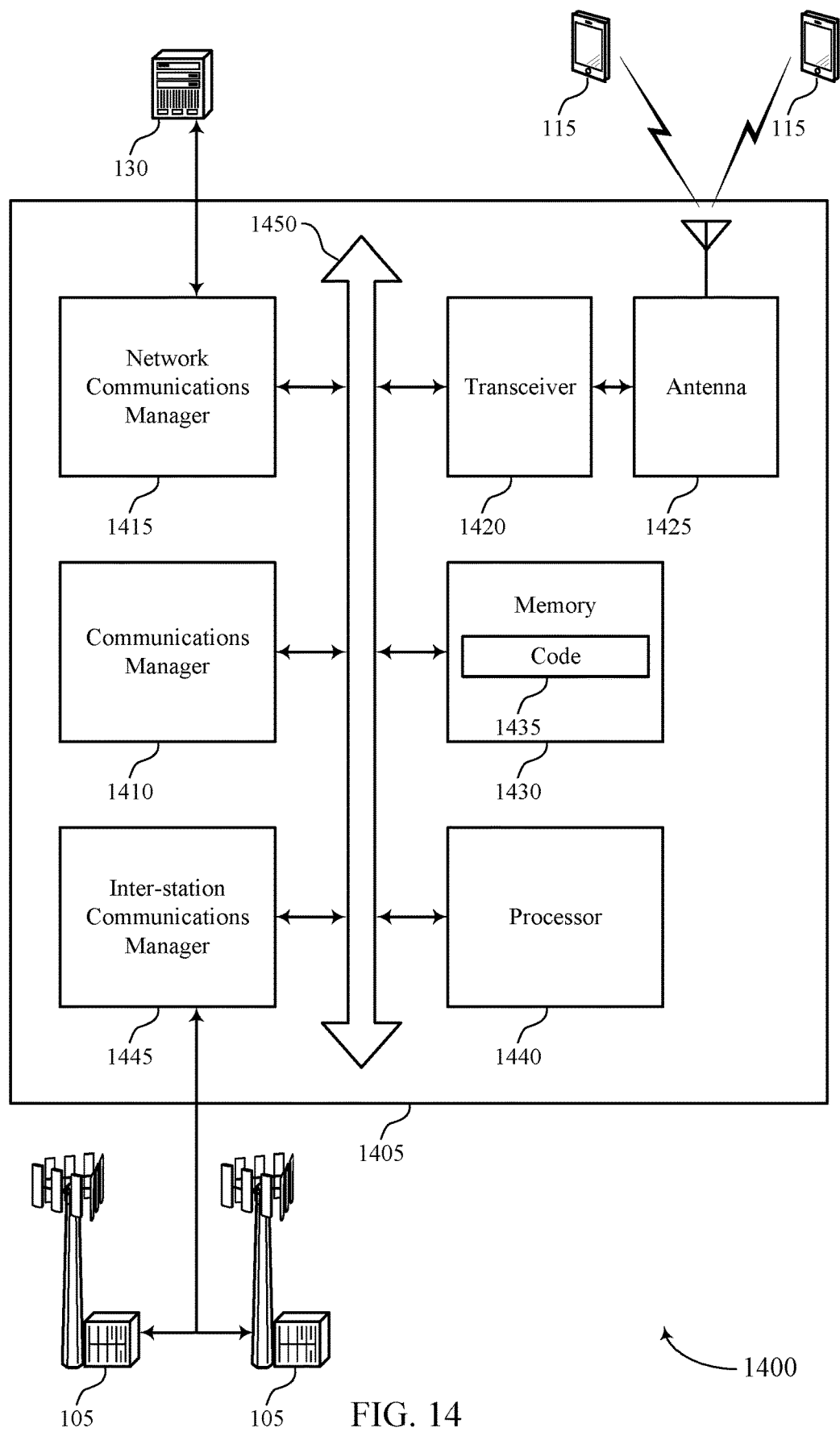
FIG. 14 shows a diagram of a system including a device that supports NOMA hopping pattern techniques for spreading sequences in accordance with aspects of the present disclosure.

FIG. 14 shows a diagram of a system 1400 including a device 1405 that supports NOMA hopping pattern techniques for spreading sequences in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may identify a set of UEs configured for concurrent uplink NOMA communications and transmit, to the set of UEs, an indication of a multiple access signature to be applied to uplink NOMA communications of each UE of the set of UEs, where the multiple access signature for each UE is based on a sequence of spreading codes and a hopping pattern applied to the sequence of spreading codes for different portions of uplink NOMA communications.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas. In some cases, the wireless device may include a single antenna 1425. However, in some cases, the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting NOMA hopping pattern techniques for spreading sequences).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
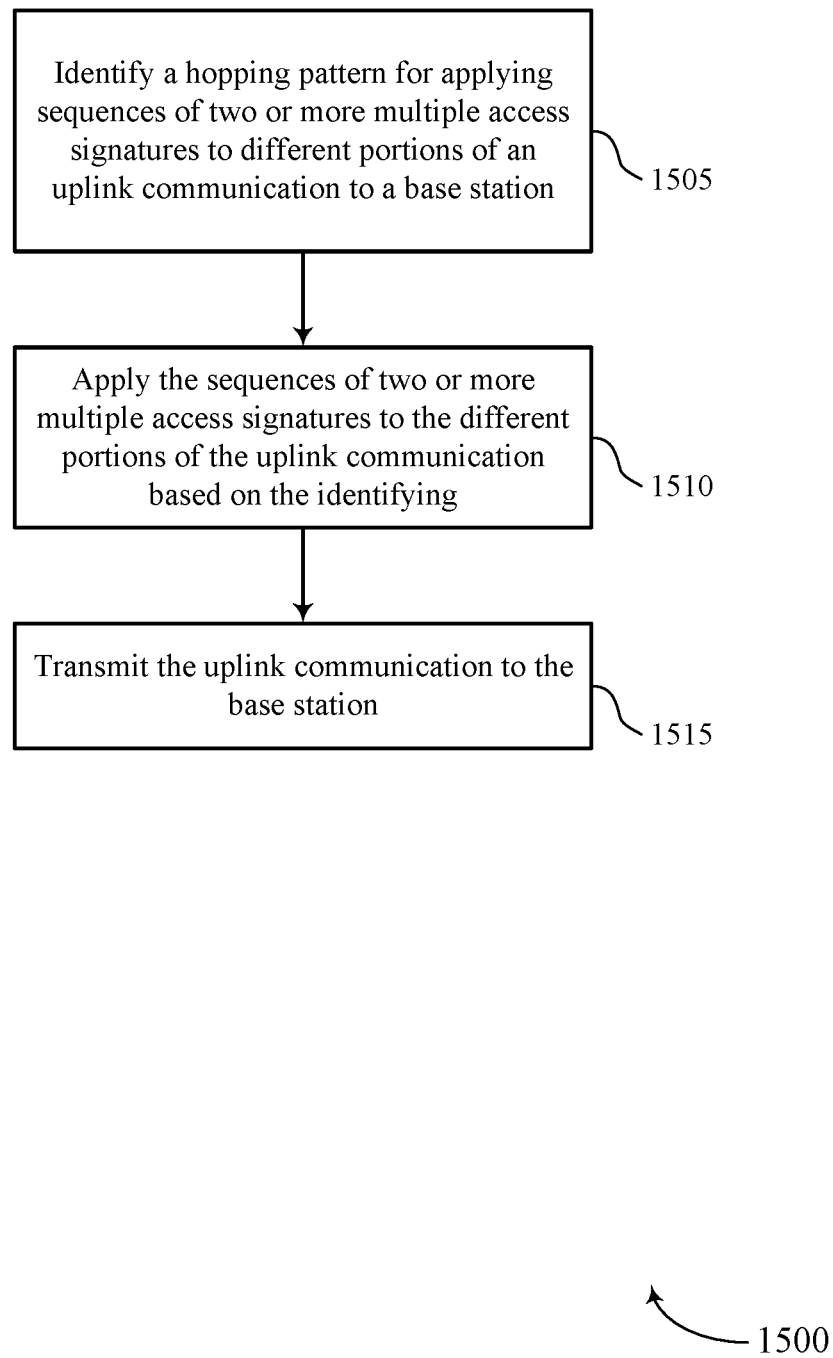
FIGS. 15 through 18 show flowcharts illustrating methods that support hopping pattern techniques for spreading sequences in accordance with aspects of the present disclosure.

FIG. 15 shows a flowchart illustrating a method 1500 that supports hopping pattern techniques for spreading sequences in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1505, the UE may identify a hopping pattern for applying sequences of two or more multiple access signatures to different portions of an uplink communication to a base station. The operations of 1505 may be performed according to the methods described herein. In some examples, aspects of the operations of 1505 may be performed by a hopping pattern manager as described with reference to FIGS. 7 through 10.

At 1510, the UE may apply the sequences of two or more multiple access signatures to the different portions of the uplink communication based on the identifying. The operations of 1510 may be performed according to the methods described herein. In some examples, aspects of the operations of 1510 may be performed by a symbol spreading component as described with reference to FIGS. 7 through 10.

At 1515, the UE may transmit the uplink communication to the base station. The operations of 1515 may be performed according to the methods described herein. In some examples, aspects of the operations of 1515 may be performed by a transmission manager as described with reference to FIGS. 7 through 10.

Figure 16:
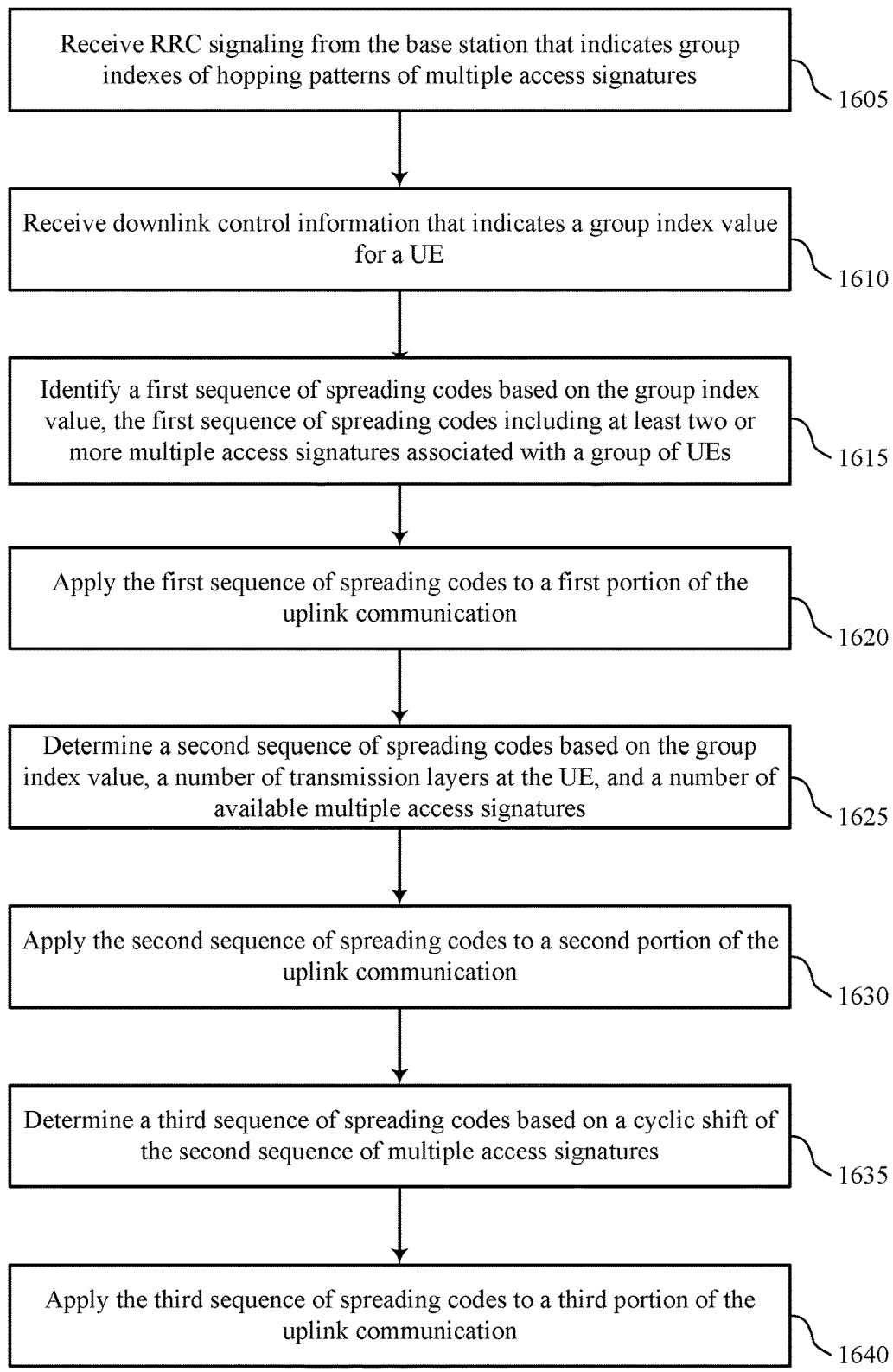

FIG. 16 shows a flowchart illustrating a method 1600 that supports hopping pattern techniques for spreading sequences in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1605, the UE may receive RRC signaling from a base station that indicates group indexes of hopping patterns of multiple access signatures. The operations of 1605 may be performed according to the methods described herein. In some examples, aspects of the operations of 1605 may be performed by an RRC component as described with reference to FIGS. 7 through 10.

At 1610, the UE may receive downlink control information that indicates a group index value for the UE. The operations of 1610 may be performed according to the methods described herein. In some examples, aspects of the operations of 1610 may be performed by a DCI component as described with reference to FIGS. 7 through 10.

At 1615, the UE may identify a first sequence of spreading codes based on the group index value, the first sequence of spreading codes including at least two or more multiple access signatures associated with the group of UEs. The operations of 1615 may be performed according to the methods described herein. In some examples, aspects of the operations of 1615 may be performed by a spreading sequence manager as described with reference to FIGS. 7 through 10.

At 1620, the UE may apply the first sequence of spreading codes to a first portion of the uplink communication. The operations of 1620 may be performed according to the methods described herein. In some examples, aspects of the operations of 1620 may be performed by a symbol spreading component as described with reference to FIGS. 7 through 10.

At 1625, the UE may determine a second sequence of spreading codes based on the group index value, a number of transmission layers at the UE, and a number of available multiple access signatures. The operations of 1625 may be performed according to the methods described herein. In some examples, aspects of the operations of 1625 may be performed by a hopping pattern manager as described with reference to FIGS. 7 through 10.

At 1630, the UE may apply the second sequence of spreading codes to a second portion of the uplink communication. The operations of 1630 may be performed according to the methods described herein. In some examples, aspects of the operations of 1630 may be performed by a symbol spreading component as described with reference to FIGS. 7 through 10.

At 1635, the UE may determine a third sequence of spreading codes based on a cyclic shift of the second sequence of spreading codes. The operations of 1635 may be performed according to the methods described herein. In some examples, aspects of the operations of 1635 may be performed by a hopping pattern manager as described with reference to FIGS. 7 through 10.

At 1640, the UE may apply the third sequence of spreading codes to a third portion of the uplink communication. The operations of 1640 may be performed according to the methods described herein. In some examples, aspects of the operations of 1640 may be performed by a symbol spreading component as described with reference to FIGS. 7 through 10.

Figure 17:
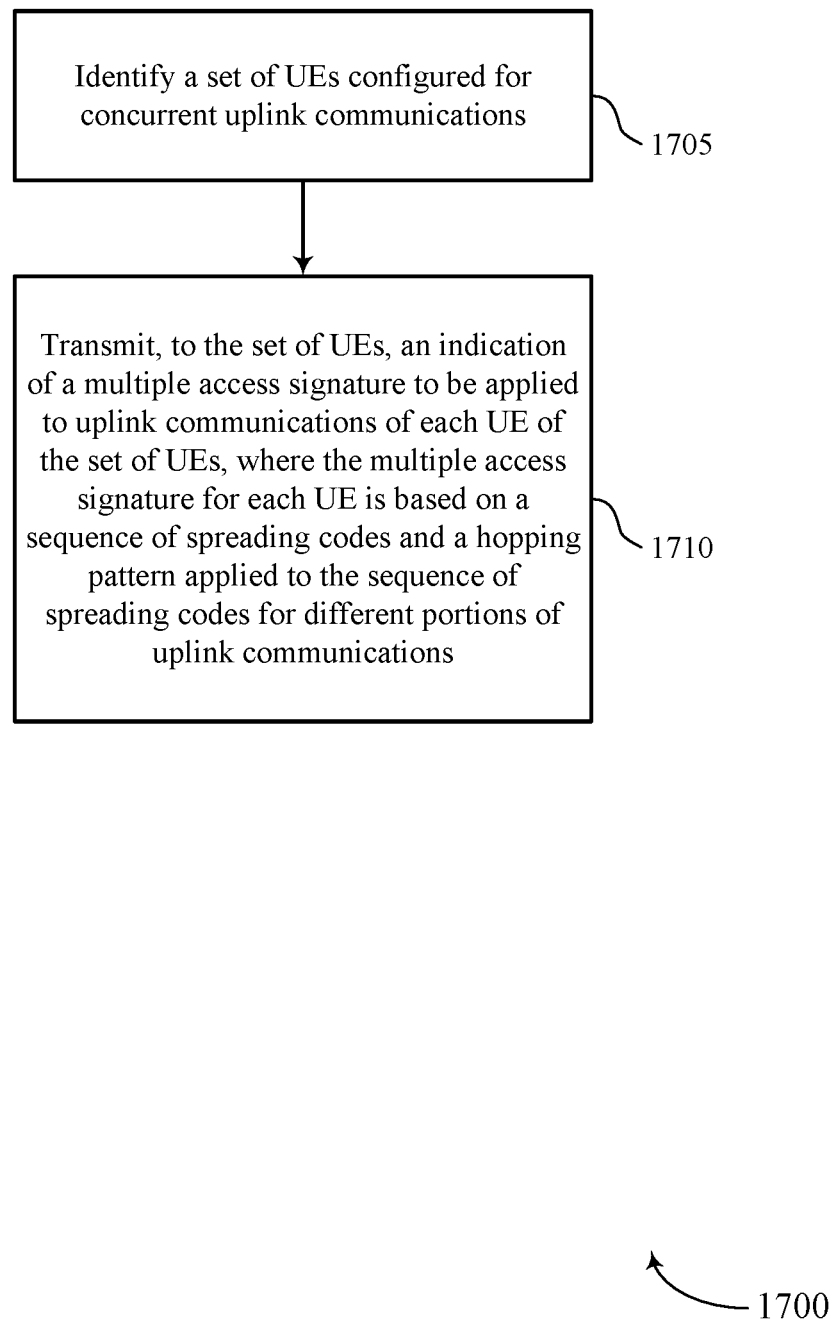

FIG. 17 shows a flowchart illustrating a method 1700 that supports hopping pattern techniques for spreading sequences in accordance with aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1705, the base station may identify a set of UEs configured for concurrent uplink communications. The operations of 1705 may be performed according to the methods described herein. In some examples, aspects of the operations of 1705 may be performed by a configuration manager as described with reference to FIGS. 11 through 14.

At 1710, the base station may transmit, to the set of UEs, an indication of a multiple access signature to be applied to uplink communications of each UE of the set of UEs, where the multiple access signature for each UE is based on a sequence of spreading codes and a hopping pattern applied to the sequence of spreading codes for different portions of uplink communications. The operations of 1710 may be performed according to the methods described herein. In some examples, aspects of the operations of 1710 may be performed by a spreading sequence manager as described with reference to FIGS. 11 through 14.

Figure 18:
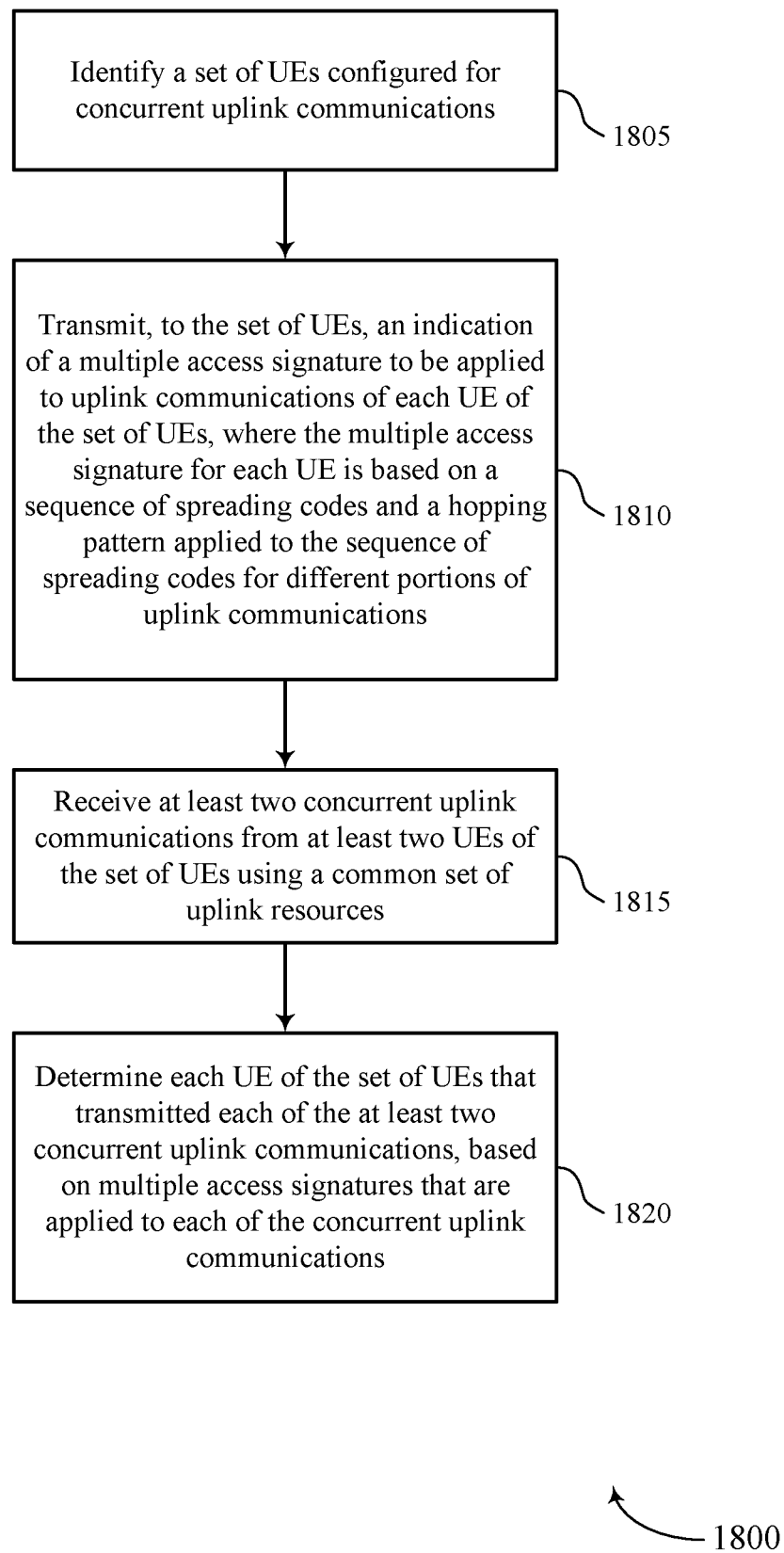

FIG. 18 shows a flowchart illustrating a method 1800 that supports hopping pattern techniques for spreading sequences in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1805, the base station may identify a set of UEs configured for concurrent uplink communications. The operations of 1805 may be performed according to the methods described herein. In some examples, aspects of the operations of 1805 may be performed by a configuration manager as described with reference to FIGS. 11 through 14.

At 1810, the base station may transmit, to the set of UEs, an indication of a multiple access signature to be applied to uplink communications of each UE of the set of UEs, where the multiple access signature for each UE is based on a sequence of spreading codes and a hopping pattern applied to the sequence of spreading codes for different portions of uplink communications. The operations of 1810 may be performed according to the methods described herein. In some examples, aspects of the operations of 1810 may be performed by a spreading sequence manager as described with reference to FIGS. 11 through 14.

At 1815, the base station may receive at least two concurrent uplink communications from at least two UEs of the set of UEs using a common set of uplink resources. The operations of 1815 may be performed according to the methods described herein. In some examples, aspects of the operations of 1815 may be performed by a communication manager as described with reference to FIGS. 11 through 14.

At 1820, the base station may determine each UE of the set of UEs that transmitted each of the at least two concurrent uplink communications, based on multiple access signatures that are applied to each of the concurrent uplink communications. The operations of 1820 may be performed according to the methods described herein. In some examples, aspects of the operations of 1820 may be performed by a MA signature component as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read-only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
identifying a hopping pattern for applying sequences of spreading codes of two or more multiple access signatures to different portions of an uplink communication to a base station;
applying, to each of the different portions of the uplink communication, a different sequence of spreading codes of the two or more multiple access signatures according to the hopping pattern, wherein applying the different sequence of spreading codes to each of the different portions of the uplink communication occurs after demultiplexing the uplink communication and prior to scrambling the uplink communication; and
transmitting each of the different portions of the uplink communication to the base station.

2. The method of claim 1, wherein the hopping pattern is a function of time and an identification of the UE, and wherein the applying comprises:
applying a first sequence of spreading codes of the two or more multiple access signatures based at least in part on a time instance associated with a first portion of the uplink communication.

3. The method of claim 2, wherein the time instance associated with the first portion of the uplink communication corresponds to a predetermined number of modulation symbols of the uplink communication.

4. The method of claim 2, wherein the time instance associated with the first portion of the uplink communication corresponds to a predetermined number of inverse fast Fourier transform (IFFT) blocks of the uplink communication.

5. The method of claim 1, wherein the applying comprises:
receiving radio resource control (RRC) signaling from the base station that indicates group indexes of hopping patterns of spreading codes;
receiving downlink control information that indicates a group index value for the UE;
identifying a first sequence of spreading codes based at least in part on the group index value, the first sequence of spreading codes including at least the two or more multiple access signatures associated with a group of UEs associated with the group index value; and
applying the first sequence of spreading codes to a first portion of the uplink communication.

6. The method of claim 5, wherein the applying further comprises:
determining a second sequence of spreading codes based at least in part on the group index value, a number of transmission layers at the UE, or a number of available multiple access signatures; and
applying the second sequence of spreading codes to a second portion of the uplink communication.

7. The method of claim 6, wherein the applying further comprises:
determining a third sequence of spreading codes based at least in part on a cyclic shift of the second sequence of spreading codes; and
applying the third sequence of spreading codes to a third portion of the uplink communication.

8. The method of claim 5, wherein the applying further comprises:
determining a second sequence of spreading codes as a reversed order of the first sequence of spreading codes;
applying the second sequence of spreading codes to a second portion of the uplink communication;
determining a third sequence of spreading codes based at least in part on a cyclic shift of the second sequence of spreading codes; and
applying the third sequence of spreading codes to a third portion of the uplink communication.

9. The method of claim 1, wherein the hopping pattern and the two or more multiple access signatures form a UE-specific multiple access signature for the uplink communication, and wherein a cross-correlation between different UE-specific multiple access signatures is below a threshold value.

10. The method of claim 1, wherein the two or more multiple access signatures are applied as symbol level spreading to a cyclic prefix orthogonal frequency division multiplexing (CP-OFDM) or a discrete Fourier transform spread OFDM (DFT-s-OFDM) waveform.

11. The method of claim 1, further comprising:
receiving multiple access signature configuration information from the base station that indicates the two or more multiple access signatures and the hopping pattern.

12. The method of claim 11, wherein the multiple access signature configuration information is received from the base station in a master information block (MIB), in a system information block (SIB), in remaining minimum system information (RMSI), in a group common PDCCH, in radio resource control (RRC) signaling, in dynamic downlink control information (DCI) associated with the uplink communication, or any combination thereof.

13. The method of claim 1, wherein the applying, to each of the different portions of the uplink communication, the different sequence of spreading codes of the two or more multiple access signatures comprises:
applying a first sequence of spreading codes to each layer of a multi-layer uplink communication; and
superimposing each layer of the multi-layer uplink communication to generate a superimposed uplink signal.

14. The method of claim 1, wherein the two or more multiple access signatures are identified from a codebook of a plurality of codebooks that each include a plurality of spreading codes.

15. The method of claim 14, further comprising:
selecting the two or more multiple access signatures from the codebook based at least in part on a UE identification or an index value assigned to the UE by the base station.

16. The method of claim 14, wherein the plurality of spreading codes of each of the plurality of codebooks include modified chirp sequences (MCPs), computer generated sequences (CGSs), pseudo-random noise (PN) sequences, or combinations thereof.

17. The method of claim 1, wherein the uplink communication comprises an uplink non-orthogonal multiple access communication.

18. A method for wireless communication at a base station, comprising:
identifying a plurality of user equipment (UEs) configured for concurrent uplink communications;
transmitting, to the plurality of UEs, an indication of a multiple access signature to be applied to uplink communications of each UE of the plurality of UEs, wherein the multiple access signature for each UE is based at least in part on a sequence of spreading codes and a hopping pattern of the sequence of spreading codes, and wherein a different sequence of spreading codes is applied for different portions of uplink communications according to the hopping pattern;
receiving at least two concurrent uplink communications from at least two UEs of the plurality of UEs using a common set of uplink resources;
determining respective multiple access signatures that were applied to each of the at least two concurrent uplink communications; and
identifying each UE of the plurality of UEs that transmitted each of the at least two concurrent uplink communications based at least in part on the respective multiple access signatures.

19. The method of claim 18, wherein the hopping pattern of each UE is a function of time and a UE identification, and a first sequence of spreading codes of a UE of the plurality of UEs is based at least in part on a time instance associated with a first portion of an uplink communication of the UE.

20. The method of claim 19, wherein the time instance associated with the first portion of the uplink communication corresponds to a predetermined number of modulation symbols of the uplink communication.

21. The method of claim 19, wherein the time instance associated with the first portion of the uplink communication corresponds to a predetermined number of inverse fast Fourier transform (IFFT) blocks of the uplink communication.

22. The method of claim 18, wherein the indication of the multiple access signature to be applied at each UE comprises a group index value, and wherein each UE identifies a corresponding sequence of spreading codes based at least in part on the group index value.

23. The method of claim 22, wherein:
a second sequence of spreading codes of each UE is based at least in part on the group index value, a number of transmission layers at the UE, and a number of available multiple access signatures; and
a third sequence of spreading codes of each UE is based at least in part on a cyclic shift of the second sequence of spreading codes.

24. The method of claim 22, wherein a second sequence of spreading codes is a reversed order of an initial sequence of spreading codes, and a third sequence of spreading codes is based at least in part on a cyclic shift of the second sequence of spreading codes.

25. The method of claim 18, wherein the hopping pattern and two or more multiple access signatures form a UE-specific multiple access signature for an uplink communication, and wherein a cross-correlation between different UE-specific multiple access signatures is below a threshold value.

26. The method of claim 18, wherein the sequence of spreading codes is applied as symbol level spreading to a cyclic prefix orthogonal frequency division multiplexing (CP-OFDM) or a discrete Fourier transform spread OFDM (DFT-s-OFDM) waveform.

27. The method of claim 18, wherein:
sequences of spreading codes are identified from a codebook of a plurality of codebooks that each include a plurality of spreading codes; and
wherein the plurality of spreading codes of each of the plurality of codebooks include modified chirp sequences (MCPs), computer generated sequences (CGSs), pseudo-random noise (PN) sequences, or combinations thereof.

28. An apparatus for wireless communication at a user equipment (UE), comprising: a processor, memory coupled to the processor; and instructions stored in the memory and executable by the processor to cause the apparatus to:
identify a hopping pattern for applying sequences of spreading codes of two or more multiple access signatures to different portions of an uplink communication to a base station;
apply, to each of the different portions of the uplink communication, a different sequence of spreading codes of the two or more multiple access signatures according to the hopping pattern, wherein applying the different sequence of spreading codes to each of the different portions of the uplink communication occurs after demultiplexing the uplink communication and prior to scrambling the uplink communication; and
transmit each of the different portions of the uplink communication to the base station.

29. An apparatus for wireless communication at a base station, comprising: a processor, memory coupled to the processor; and instructions stored in the memory and executable by the processor to cause the apparatus to:
identify a plurality of user equipment (UEs) configured for concurrent uplink non-orthogonal multiple access communications;
transmit, to the plurality of UEs, an indication of a multiple access signature to be applied to uplink communications of each UE of the plurality of UEs, wherein the multiple access signature for each UE is based at least in part on a sequence of spreading codes and a hopping pattern of the sequence of spreading codes, and wherein a different sequence of spreading codes is applied for different portions of uplink communications according to the hopping pattern;
receive at least two concurrent uplink communications from at least two UEs of the plurality of UEs using a common set of uplink resources;
determine respective multiple access signatures that were applied to each of the at least two concurrent uplink communications; and
identify each UE of the plurality of UEs that transmitted each of the at least two concurrent uplink communications based at least in part on the respective multiple access signatures.

* * * * *